US009179153B2

(12) United States Patent
Tian et al.

(10) Patent No.: US 9,179,153 B2
(45) Date of Patent: Nov. 3, 2015

(54) REFINED DEPTH MAP

(75) Inventors: Dong Tian, Plainsboro, NJ (US); Purvin Bibhas Pandit, Franklin Park, NJ (US); Peng Yin, Ithaca, NY (US)

(73) Assignee: Thomson Licensing, Issy les Moulineaux (FR)

( * ) Notice: Subject to any disclaimer, the term of this patent is extended or adjusted under 35 U.S.C. 154(b) by 1074 days.

(21) Appl. No.: 12/737,838

(22) PCT Filed: Aug. 6, 2009

(86) PCT No.: PCT/US2009/004555
§ 371 (c)(1),
(2), (4) Date: Feb. 18, 2011

(87) PCT Pub. No.: WO2010/021666
PCT Pub. Date: Feb. 25, 2010

(65) Prior Publication Data
US 2011/0142138 A1 Jun. 16, 2011

Related U.S. Application Data

(60) Provisional application No. 61/189,552, filed on Aug. 20, 2008.

(51) Int. Cl.
*H04N 7/26* (2006.01)
*H04N 19/132* (2014.01)
(Continued)

(52) U.S. Cl.
CPC ......... *H04N 19/132* (2013.01); *H04N 13/0022* (2013.01); *H04N 19/162* (2013.01); *H04N 19/46* (2013.01); *H04N 19/597* (2013.01); *H04N 19/61* (2013.01); *H04N 2213/005* (2013.01)

(58) Field of Classification Search
CPC ............... H04N 13/0022; H04N 2213/005; H04N 19/00127; H04N 19/0023; H04N 19/00545; H04N 19/00769; H04N 19/00781; H04N 19/132; H04N 19/162; H04N 19/46; H04N 19/597; H04N 19/61; H04N 19/52; H04N 19/56; H04N 19/577; G06T 15/205; G06T 7/0065
USPC ........................................ 375/240.01–240.29
See application file for complete search history.

(56) References Cited

U.S. PATENT DOCUMENTS 4,849,224 A 7/1989 Chang et al.
5,517,245 A 5/1996 Kondo et al.
(Continued)

FOREIGN PATENT DOCUMENTS

CN 1913640 2/2007
CN 1984335 6/2007
(Continued)

OTHER PUBLICATIONS

Yoon et al. "A Framework for Representation and Processing of Multi-view Video Using the Concept of Layered Depth Image". (Mar. 2007) Joun. of VLSI Signal Processing, 46, 87-102.*
(Continued)

*Primary Examiner* — Sath V Perungavoor
*Assistant Examiner* — Nathnael Aynalem
(74) *Attorney, Agent, or Firm* — Robert D. Shedd; Brian J. Cromarty

(57) ABSTRACT

Various implementations are described. Several implementations relate to a refined depth map. According to one aspect, depth information for a picture in a set of pictures is accessed. Modified depth information for the picture is accessed. A refinement is determined that characterizes a difference between the depth information and the modified depth information. The refinement, and the depth information, is provided for use in processing one or more pictures in the set of pictures.

50 Claims, 17 Drawing Sheets

(51) Int. Cl.
*H04N 13/00* (2006.01)
*H04N 19/597* (2014.01)
*H04N 19/46* (2014.01)
*H04N 19/61* (2014.01)
*H04N 19/162* (2014.01)

(56) References Cited

U.S. PATENT DOCUMENTS

| | | | |
|---|---|---|---|
| 5,557,684 A | 9/1996 | Wang et al. | |
| 5,767,907 A | 6/1998 | Pearlstein | |
| 6,064,393 A * | 5/2000 | Lengyel et al. | 345/427 |
| 6,111,979 A | 8/2000 | Katto | |
| 6,188,730 B1 | 2/2001 | Ngai et al. | |
| 6,320,978 B1 | 11/2001 | Szeliski et al. | |
| 6,326,964 B1 * | 12/2001 | Snyder et al. | 345/419 |
| 6,348,918 B1 * | 2/2002 | Szeliski et al. | 345/419 |
| 6,504,872 B1 | 1/2003 | Fimoff et al. | |
| 6,940,538 B2 | 9/2005 | Rafey et al. | |
| 7,003,136 B1 | 2/2006 | Harville | |
| 7,289,674 B2 | 10/2007 | Karczewicz | |
| 7,671,894 B2 | 3/2010 | Yea et al. | |
| 8,538,159 B2 * | 9/2013 | Lu | 382/195 |
| 8,593,506 B2 * | 11/2013 | Peleg et al. | 348/36 |
| 2002/0110273 A1 | 8/2002 | Dufour | |
| 2003/0235338 A1 | 12/2003 | Dye | |
| 2004/0095999 A1 | 5/2004 | Piehl et al. | |
| 2005/0286759 A1 | 12/2005 | Zitnick et al. | |
| 2006/0031915 A1 | 2/2006 | Winder et al. | |
| 2006/0072852 A1 * | 4/2006 | Kang et al. | 382/294 |
| 2007/0030356 A1 | 2/2007 | Yea et al. | |
| 2007/0035530 A1 | 2/2007 | Van Geest et al. | |
| 2007/0103465 A1 * | 5/2007 | Barenbrug et al. | 345/426 |
| 2007/0104276 A1 | 5/2007 | Ha | |
| 2007/0109409 A1 | 5/2007 | Yea et al. | |
| 2007/0171987 A1 | 7/2007 | Trimeche | |
| 2007/0291850 A1 | 12/2007 | Ishikawa et al. | |
| 2008/0303892 A1 | 12/2008 | Kim et al. | |
| 2008/0310499 A1 | 12/2008 | Kim et al. | |
| 2009/0129667 A1 | 5/2009 | Ho et al. | |
| 2009/0185627 A1 | 7/2009 | Park et al. | |
| 2010/0188476 A1 | 7/2010 | Thapa | |
| 2011/0038418 A1 | 2/2011 | Pandit et al. | |
| 2011/0142138 A1 | 6/2011 | Tian et al. | |
| 2011/0261050 A1 | 10/2011 | Smolic et al. | |
| 2011/0268177 A1 | 11/2011 | Tian et al. | |

FOREIGN PATENT DOCUMENTS

| | | |
|---|---|---|
| CN | 101166271 | 4/2008 |
| JP | 8018976 | 1/1996 |
| JP | 9289638 | 11/1997 |
| JP | 10178639 | 6/1998 |
| JP | 2000023198 | 1/2000 |
| JP | 2000078611 | 3/2000 |
| JP | 2000215311 | 8/2000 |
| JP | 2000231985 | 8/2000 |
| JP | 2002058031 | 2/2002 |
| JP | 2003306710 | 1/2006 |
| KR | 20090055803 | 6/2009 |
| WO | WO03105070 | 12/2003 |
| WO | WO2005013623 | 2/2005 |
| WO | WO2007047736 | 4/2007 |
| WO | WO2008007913 | 1/2008 |
| WO | WO2008035665 | 3/2008 |
| WO | WO2008049052 | 4/2008 |
| WO | WO2008133455 | 11/2008 |
| WO | WO2009001255 | 12/2008 |
| WO | WO2009023044 | 2/2009 |
| WO | WO2009069958 | 6/2009 |
| WO | WO2009131703 | 10/2009 |
| WO | WO2010021664 | 2/2010 |
| WO | WO2010021666 | 2/2010 |
| WO | WO2010144074 | 12/2010 |

OTHER PUBLICATIONS

Seitz et al. "View Morphing". (1996) SIGGRAPH '96 Proceedings of the 23rd annual conference on Computer graphics and interactive techniques. p. 21-30.*

Imazumi et al. "Depth Estimation Algorithm for Multiocular Images using Distribution of Matchin Cost on an Epipolar Line", IPSF SIG Technical Reports 2000-CVIM-120, vol. 2000, No. 7, pp. 9-16.*

Merkle et al., "Efficient Compression of Multi-view Video Exploiting Inter-View Dependencies Based on H.264/MPEG4-AVC", IEEE 2006 int'l. Conference on Multimedia and Expo, Jul. 1, 2006, p. 1717-1720.*

Internation Standard, Information Technology—MPEG Video Technologies—Part 3: "Representation of Auxiliary Video and Supplemental Information", ISO/IEC 23002-3, First Edition, Oct. 15, 2007, 34 pages.*

Smolic et al, "Coding Algorithms for 3DTV-a Survey", IEEE Transactions on Circuits and Systems for Video Technology, vol. 17, No. 11, ISSN: 1051-8215, Piscataway, NJ, Nov. 1, 2007.

Ince et al, "Depth Estimation for View Synthesis in Multiview Video Coding", 3DTV Conference, pp. 1-4, May 1, 2007.

Kauff et al., "Depth Map Creation and Image-Based Rendering for Advanceed 3DTV Services Providing Interoperability and Scalability", Signal Processing, Image Communicatin, vol. 22, No. 12, pp. 217-234, ISSN: 0923-5965, Mar. 16, 2007.

Na et al., "Multi-View Depth Video Coding Using Depth View Synthesis", Circuits and Systems, ISCAS 2008, pp. 1400-1403, Piscataway, NJ, May 18, 2008.

ITU-T H.264, "Advanced Video Coding for Generic Audiovisual Services", Series H: Audiovisual and Multimedia Systems, International Telecommunication Union, Mar. 2005.

Zhu et al., "MVC Inter-view Skip Mode with Depth Information", Video Communication Reserach Group, JVT-Z029, 13 Slides, Jun. 15, 2009.

Zhu et al., "MVC Inter-view Skip Mode with Depth Information", Video Communication Reserach Group, 13 Slides, JVT-Z029, Feb. 8, 2010.

Ozkalayci et al., "Multi-view Video Coding via Dense Depth Estimation", Department of Electrical and Electronics Engineering, Ankara, Turkey, No Date.

Vetro et al., "Joint Multiview Video Model (JMVM) 6.0", JVT of ISO/IEC MPEG & ITU-T VCEG (ISO/IEC JTC1/SC29/WG11 and ITU-T SG16 Q.6), Document: JVT-Y207, 25th Meeting: Shenzhen, CN, Oct. 21-26, 2007.

Morvan et al., "Depth-Image Compression Based on an R-D Optimized Quadtree Decomposition for the Transmission of Multiview Images", ICIP 2007, IEEE.

Oh, "H.264-based Depth Map Sequence Coding Using Motion Information of Texture Video", Department of Information and Communications, Gwangju Institute of Science and Technology, Gwangju, Korea, Jun. 12, 2006.

Vetro et al., "Joint Draft 6.0 on Multiview Video Coding", JVT of ISO/IEC MPEG & ITU-T VCEG (ISO/IEC JTC1/SC29/WG11 and ITU-T SG16 Q.6), Document: JVT-Z209, 26th Meeting: Antalya, Turkey, Jan. 13-18, 2008.

Smolic et al., "3D Video and Free Viewpoint Video—Technologies, Applications and MPEG Standards", Fraunhofer Institute for Telecommunications, Berlin, Germany 2006 IEEE.

Muller et al., "View Synthesis for Advanced 3D Video Systems", EURASIP Journal on Image and Video Processing, vol. 2008, Article ID 438148, 11 pages, Mar. 31, 2008.

Vetro et al., "Towards a 3D Video Format for Auto-Stereoscopic Displays", Mitsubishi Electric Research Laboratories, TR2008-057, Sep. 2008, Cambridge, Massachusetts.

Tam et al., "Smoothing Depth Maps for Improved Stereoscopic Image Quality", Communications Research Centre Canada, Ottawa, Ontario, no date.

Schreer et al., "Algorithms, concepts and Real-time Systems in Human Centred Communication", 3D Videocommunication, Table of Conetns, No date.

(56) References Cited

OTHER PUBLICATIONS

Zhu et al., "Inter-view Skip Mode with Depth Information", JVT of ISO/IEC MPEG & ITU-T VCEG (ISO/IEC JTC1/SC29/WG11 and ITU-T SG16 Q.6), Document: JVT-Z029, 26th Meeting: Antalya, TR, Jan. 13-18, 2008.

Koo et al., "MVC Motion Skip Mode", JVT 23rd Meeting, Document: JVT-W081, San Jose, CA, Apr. 21-27, 2007.

Smolic et al., "Intermediate View Interpolation Based on Multiview Video Plus Depth for Advanced 3D Video Systems", Fraunhofer Institute for Telecommunicationis, Berlin, Germany, 2008 IEEE.

Yea et al., "Report on Core Experiment CE3 of Multiview Coding", International Organisation for Standardisation, ISO/IEC JTC1/SC29/WG11, Document M13695, Klagenfurt, Austria, Jul. 2006.

Merkle et al., "Efficient Compression of Multi-view Depth Data Based on MVC", Fraunhofer Institute for Telecommunications, Berlin, Germany, no date.

Chen, "A Condition-based Intra Prediction Algorithm for H.264/AVC", Department of Computer Science and Information Engineering, Taiwan, China, 2006 IEEE.

Merkle et al., "Multi-View Video Plus Depth Representation and Coding", Image Communication Group, ICIP2007, 2007 IEEE.

Meng et al., "Fast Intra-Prediction Mode Selection for 4×4 Blocks in H.264", Dept. of Electrical and Electronic Engineering, 2003 IEEE.

Martinian et al., "Extensions of H.264/AVC for Multiview Video Compression", Mitsubishi Electric Research Laboratories, TR2006-048, Jun. 2006, Cambridge, MA.

Krishnamurthy et al., "Compression and Transmission of Depth Maps for Image-Based Rendering", Sarnoff Corporation, Princeton, NJ 2001 IEEE.

Grewatsch et al., "Sharing of Motion Vectors in 3D Video Coding", Institute of Communications Engineering, 2004, IEEE, Rostock, Germany.

Ekmekcioglu et al., "Bit-Rate Adaptive Downsampling for the Coding of Multi-View Video with Depth Information", 3DTV-CON'08, Center for Communication Systems Research, May 28-30, 2008, Istanbul, Turkey.

Grewatsch et al., "Evaluation of Motion Compensation and Coding Strategies for Compression of Depth Map Sequences", Proc. of SPIE, Vo. 5561, Bellingham, WA, 2004.

Vetro et al., "Joint Draft 3.0 on Multiview Video Coding", JVT of ISO/IEC MPEG & ITU-T VCEG, Document: JVT-W209, 23rd Meeting: San Jose, Apr. 21-27, 2007.

Martinian et al, "View Synthesis for Multiview Video Compression", Picture Coding Symposium, Beijing, China, Apr. 24, 2006.

ITU-T H.264, "Advanced Video Coding for Generic Audiovisual Services", Series H: Audiovisual and Multimedia Systems, International Telecommunication Union, May 2003.

Search Report Dated: Nov. 18, 2009.

Schreer et al., "3D Videocommunication—Algorithms, Concepts and Real-Time Systems in Human Centred Communication", John Wiley & Sons, Ltd., Berlin, Germany, Apr. 30, 2009.

Liatsis et al., "Depth Estimation via Parallel Coevolution of Disparity Functions for Area-Based Stereo", Proceedings of SPIE, vol. 4190, 2001, pp. 169-180.

Smolic et al., "3D Video and Free Viewpoint Video—Technologies, Applications and MPEG Standards", Fraunhofer Institute for Telecommunications/Heinrich-Hertz-Institut, Berling, Germany, 2006 IEEE.

International Organisation for Standardisation Organisation Internationale De Normalisation, "Call for Contributions on 3D Video Test Material (Update)", ISO/IEC JTC1/SC29/WG11, Antalya, Turkey, Jan. 2008, 19 pages.

Cigla et al., "Region-Based Dense Depth Extraction for Multi-View Video", ICIP 2007, Turkey, 2007, pp. 213-216.

ISO/IEC JTC1/SC29/WG11, MPEG2008/N10173, "Description of Exploration Experiments in 3D Video Coding", Busan, Korea, Oct. 2008, 11 pages.

Kanade et al., "A Stereo Matching Algorithm with an Adaptive Window: Theory and Experiment", IEEE Transactions on Pattern Analysis and Machine Intelligence, vol. 16, Sep. 1994, pp. 920-932.

Lai et al., "A Generalized Depth Estimation Algorithm with a Single Image", IEEE Transactions on Pattern Analysis and Machine Intelligence, vol. 14, No. 4, Apr. 1992, pp. 405-411.

ISO/IEC JTC1/SC29/WG11, MPEG2008/M15377, "Reference Softwares for Depth Estimation and View Synthesis", Archamps, France, Apr. 2008, 18 pages.

Vetro et al., "Joint Draft 3.0 on Multiview Video Coding", JVT of ISO/IEC MPEG & ITU-T VCEG, Document: JVT-W209, 23rd Meeting: San Jose, CA, Apr. 21-17, 2007.

Vetro et al., "Joint Multiview Video Model (JMVM) 6.0", JVT of ISO/IEC MPEG & ITU_T VCEG, Document: JVT-Y207, 25th Meeting: Shenzhen, China, Oct. 21-26, 2006.

Application entitled Video Depth Coding, PU080003, Provisional.

Merkle et al., "Efficient Compression of Multi-view Video Exploiting Inter-View Dependencies Based on H.264/MPEG4-AVC", IEEE 2006 Int'l. Conference on Multimedia and Expo, Jul. 1, 2006, pp. 1717-1720.

Yea et al., "Report on Core Experiment CE3 of Multiview Coding", International Organisation for Standardisation, ISO/IEC JTC1/SC29/WG11, Document: M13695, Klagenfurt, Austria, Jul. 2006.

Thomson, "Intra Skip Mode for Depth Coding", Corporate Research, Princeton, New Jersey, Jun. 2008, 10 pages.

International Standard, Information Technology—MPEG Video Technologies—Part 3: "Representation of Auxiliary Video and Supplemental Information", ISO/IEC 23002-3, First Edition, Oct. 15, 2007, 34 pages.

Imaizumi et al., "Depth Estimation Algorithm for Multiocular Images using Distribution of Matching Cost on an Epipolar Line", IPSF SIG Technical Reports 2000-CVIM-120, vol. 2000, No. 7, pp. 9-16.

Smolic et al., "Multi-view video plus depth (MVD) format for advanced 3D video systems", 23 Mtg. San Jose, CA, USA, Apr. 21-27, 2007, JVT of ISO/IEC MPEG & ITU-T VCEG, Doc. No. JVT-W100, pp. 1-7.

* cited by examiner

REFINED DEPTH MAP

CROSS-REFERENCE TO RELATED APPLICATIONS

This application claims the benefit, under 35 U.S.C. §365 of International Application PCT/US2009/004555, filed Aug. 6, 2009, which was published in accordance with PCT Article 21(2) on Feb. 25, 2010 in English and which claims the benefit of U.S. provisional patent application No. 61/189,552, filed Aug. 20, 2008.

TECHNICAL FIELD

Implementations are described that relate to coding systems. Various particular implementations relate to a refined depth map.

BACKGROUND

It has been widely recognized that Multi-view Video Coding is a key technology that serves a wide variety of applications, including free-viewpoint and three-dimensional (3D) video applications, home entertainment and surveillance. In addition, depth data may be associated with each view. Depth data is generally essential for view synthesis. In those multi-view applications, the amount of video and depth data involved is typically enormous. Thus, there exists at least the desire for a framework that helps improve the coding efficiency of current video coding solutions performing simulcast of independent views.

A multi-view video source includes multiple views of the same scene. As a result, there typically exists a high degree of correlation between the multiple view images. Therefore, view redundancy can be exploited in addition to temporal redundancy. View redundancy can be exploited by, for example, performing view prediction across the different views.

In a practical scenario, 3DV systems may encode partial views and the other views will be reconstructed using view synthesis. The residual signal for the skipped views may be sent if higher quality is required. Moreover, the synthesized pictures can serve as references to encode the subsequent pictures.

SUMMARY

According to a general aspect, depth information for a picture in a set of pictures is accessed. Modified depth information for the picture is accessed. A refinement is determined that characterizes a difference between the depth information and the modified depth information. The refinement, and the depth information, are provided for use in processing one or more pictures in the set of pictures.

According to another general aspect, depth information for a picture in a set of pictures is accessed. A refinement is accessed that characterizes a difference between the depth information for the picture and modified depth information for the picture. The modified depth information for the picture is determined. One or more pictures in the set of pictures are processed using the modified depth information.

The details of one or more implementations are set forth in the accompanying drawings and the description below. Even if described in one particular manner, it should be clear that implementations may be configured or embodied in various manners. For example, an implementation may be performed as a method, or embodied as apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Figure 1:
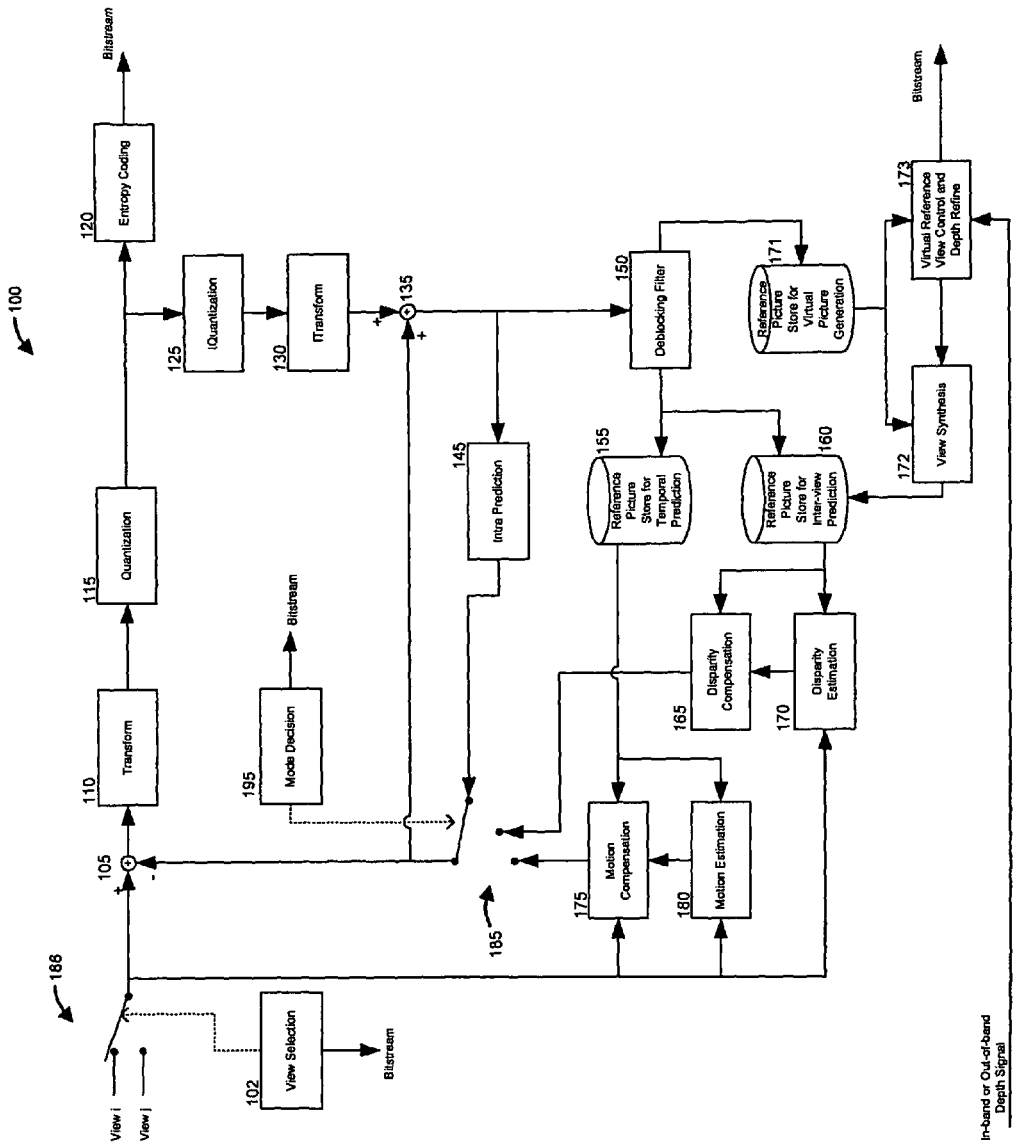
FIG. 1 is a diagram of an implementation of an encoder.

Relating generally to the present principles, and in relation to at least one implementation, it is to be appreciated that in some circumstances, a subsequent view may use view 1 as a reference by warping view 1 to the location of the subsequent view. Such warping generally requires/uses the depth of the reference view 1. A large residue may result in the predictive coding of the subsequent view, and so we may refine the depth of view 1 to get better coding results. Such a process results in two depth maps (DMs) and both depth maps may be sent, or as explained in various implementations in this application, one depth map and a one refinement may be sent. One depth map is good for coding and the original depth map is good for rendering at the decoder (synthesizing a virtual view for the viewer). The coding depth map is used, for example, to generate additional reference views (for coding/decoding). The rendering depth map is used, for example, to generate additional views for the user. These two purposes may have different measures of quality. A depth map may be good for coding, but produce subjectively lousy views to look at, for example. However, sending two depth maps is expensive.

In at least one implementation, we propose to send the refinement instead of the complete second depth map. We also provide a way to iterate on the refinement by considering cost. We also have refinements that are possible for each warped-to location (view) for a given reference. We also can do signaling/refinement by pixel, partition, macroblock, slice, frame, and so forth, or a combination of one or more of the preceding (e.g., frame+macroblock).

Warping a reference view can be done by forward warping using a view's depth, or by reverse warping in which we warp the view's depth and use that warped depth to look back (reverse warp) to get a reference view's pixels that belong in (correspond to) a given location in a warped reference view.

A refinement can be coded in a number of ways. For example, as a third component, in which case it may be predictively encoded using other refinements, or as another image in a sequence or another view.

Depth images may be obtained by external means that are out of the control of the encoder and decoder, which are transmitted for rendering purposes. However, as just described, the depth images for rendering purposes may not be efficient for coding purposes. Moreover, the inventors have determined that it is not an optimal solution if the two versions of the depth images are independently coded and transmitted.

In at least one implementation, we propose a framework for using a refined depth map. In one such framework, we propose to transmit a refinement signal of the depth images which can be used to modify the original depth images. In one implementation, the original depth images are used for rendering purposes, and the modified depth images are used for coding. The refinement of the original depth images improves the coding efficiency. In at (east one implementation, we propose to transmit a refinement of the original depth map along with the multiple view plus depth sequence, which can benefit the compression efficiency.

One problem addressed by at least one disclosed implementation is efficient multiple-view coding using refined depth map. A multiple-view video sequence is a set of two or more video sequences that capture the same scene from different viewpoints.

At least one implementation can also be applied to quality scalable coding, where better quality can be achieved for coded/synthesized views by receiving additional depth refinement.

In at least one implementation, we propose to address the problem of using a refinement on the depth image to improve the coding efficiency of the 3D Video. It should be noted that the techniques described are not limited to multiple view coding, and can be applied to multiple depth coding too. For example, it is to be appreciated that the present principles can be applied to depth map encoding. That is, we can refine a depth map, and use the refinement to predictively encode the depth map at another view. The encoding would involve, for example, warping the refined depth map to the location of the "other view" and using the warped map as a reference to predictively encode the original depth map for this "other view".

Note that "depth information" is a general term referring to various kinds of information about depth. One type of depth information is a "depth map", which generally refers to a per-pixel depth image. Other types of depth information include, for example, using a single depth value for each coded block rather than for each coded pixel. Further, depth information may be provided for an entire picture, or for less than the entire picture by focusing on, for example, foreground objects.

It is to be appreciated that while one or more implementations described herein involve two depth maps, the present principles are not limited solely to the preceding and, thus, other implementations may involve other numbers of depth maps. For example, given the teachings of the present principles provided herein, other implementation may involve, in addition to a first and second depth map, one or more of, for example, a third depth map, a fourth depth map, and so forth. Other uses for additional depths maps beyond two may be readily determined by one of ordinary skill in this and related arts, while maintaining the spirit of the present principles.

FIG. 1 shows an exemplary video encoder 100 to which the present principles may be applied, in accordance with an embodiment of the present principles. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. A first output of the deblocking filter 150 is connected in signal communication with an input of a reference picture store 155 (for temporal prediction) and a first input of a reference picture store 160 (for inter-view prediction). An output of the reference picture store 155 is connected in signal communication with a first input of a motion compensator 175 and a first input of a motion estimator 180. An output of the motion estimator 180 is connected in signal communication with a second input of the motion compensator 175. An output of the reference picture store 160 is connected in signal communication with a first input of a disparity estimator 170 and a first input of a disparity compensator 165. An output of the disparity estimator 170 is connected in signal communication with a second input of the disparity compensator 165.

A second output of the deblocking filter 150 is connected in signal communication with an input of a reference picture store 171 (for virtual picture generation). A first output of the reference picture store 171 is connected in signal communication with a first input of a view synthesizer 172 and a first input of a virtual reference view controller and depth refiner 173. A first output of the virtual reference view controller 173 is connected in signal communication with a second input of the view synthesizer 172.

An output of the entropy decoder 120, a second output of the virtual reference view controller 173, a first output of a mode decision module 195, and a first output of a view selector 102, are each available as respective outputs of the encoder 100, for outputting a bitstream. A second input of the virtual reference view controller and depth refiner 173 is available as an input to the encoder 100, for receiving an in-band or out-of-band depth signal. A first input (for picture data for view i) and a second input (for picture data for view j) of a switch 188 are each available as respective inputs to the encoder 100. An output (for providing a synthesized view) of the view synthesizer 172 is connected in signal communication with a second input of the reference picture store 160. A second output of the view selector 102 determines which input (e.g., picture data for view i, view j, or a synthesized view) is provided to the switch 188. An output of the switch 188 is connected in signal communication with a non-inverting input of the combiner 105, a third input of the motion compensator 175, a second input of the motion estimator 180, and a second input of the disparity estimator 170. An output of an intra predictor 145 is connected in signal communication with a first input of a switch 185. An output of the disparity compensator 165 is connected in signal communication with a second input of the switch 185. An output of the motion compensator 175 is connected in signal communication with a third input of the switch 185. An output of the mode decision module 195 determines which input is provided to the switch 185. An output of a switch 185 is connected in signal communication with a second non-inverting input of the combiner 135 and with an inverting input of the combiner 105.

Portions of FIG. 1 may also be referred to as an encoder, an encoding unit, or an accessing unit, such as, for example, blocks 110, 115, and 120, either individually or collectively. Similarly, blocks 125, 130, 135, and 150, for example, may be referred to as a decoder or decoding unit, either individually or collectively.

Figure 2:
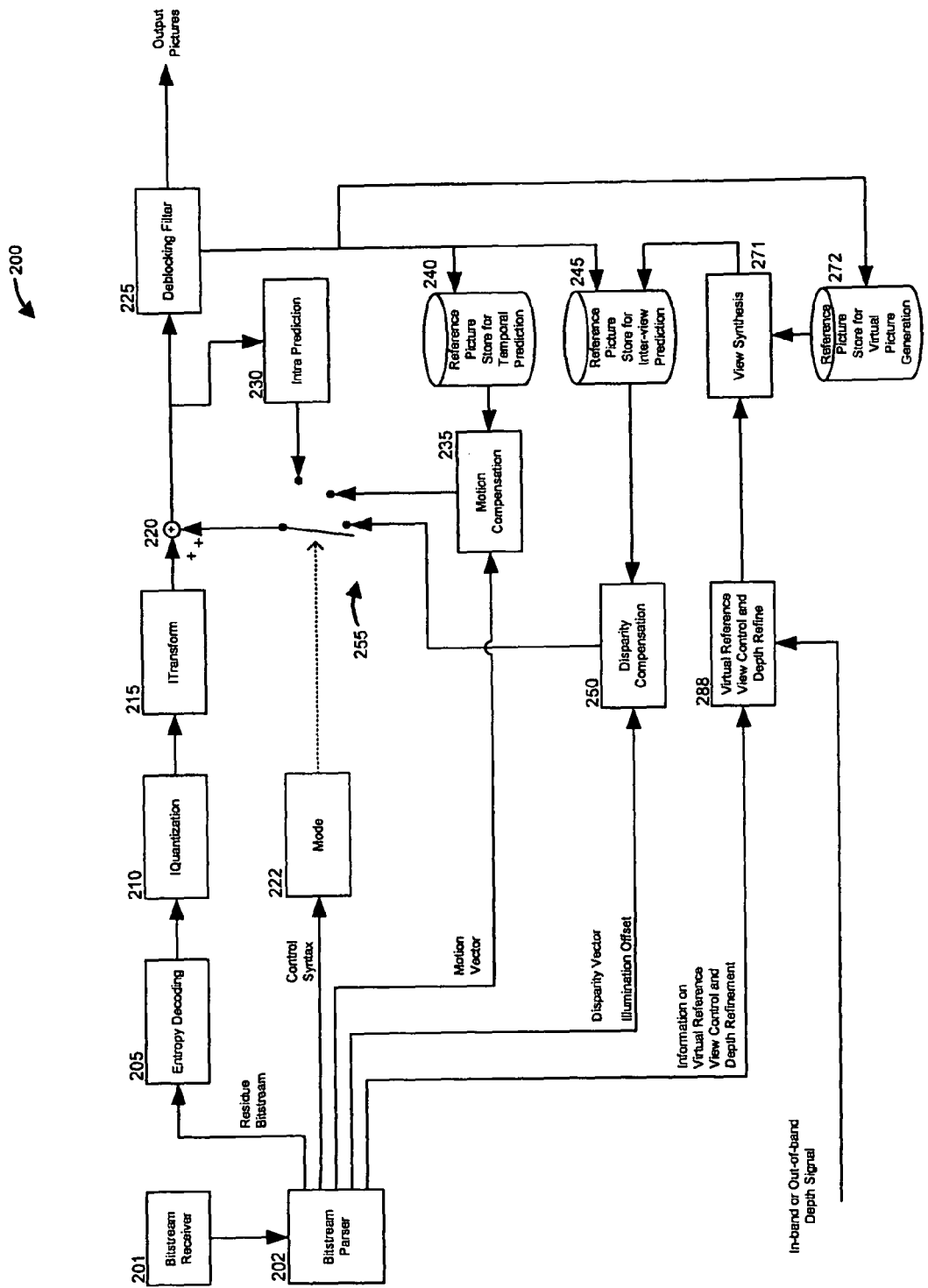
FIG. 2 is a diagram of an implementation of a decoder.

FIG. 2 shows an exemplary decoder 200 to which the present principles may be applied, in accordance with an embodiment of the present principles. The decoder 200 includes an entropy decoder 205 having an output connected in signal communication with an input of an inverse quantizer 210. An output of the inverse quantizer is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. A first output of the deblocking filter 225 is connected in signal communication with an input of a reference picture store 240 (for temporal prediction), a first input of a reference picture store 245 (for inter-view prediction), and an input of a reference picture store 272 (for virtual picture generation). An output of the reference picture store 240 is connected in signal communication with a first input of a motion compensator 235. An output of a reference picture store 245 is connected in signal communication with a first input of a disparity compensator 250.

An output of a bitstream receiver 201 is connected in signal communication with an input of a bitstream parser 202. A first output (for providing a residue bitstream) of the bitstream parser 202 is connected in signal communication with an input of the entropy decoder 205. A second output (for providing control syntax to control which input is selected by the switch 255) of the bitstream parser 202 is connected in signal communication with an input of a mode selector 222. A third output (for providing a motion vector) of the bitstream parser 202 is connected in signal communication with a second input of the motion compensator 235. A fourth output (for providing a disparity vector and/or illumination offset) of the bitstream parser 202 is connected in signal communication with a second input of the disparity compensator 250. A fifth output (for providing virtual reference view control and depth refinement information) of the bitstream parser 202 is connected in signal communication with a first input of a virtual reference view controller and depth refiner 288. An output of the virtual reference view controller and depth refiner 288 is connected in signal communication with a first input of the view synthesizer 271. An output of the view synthesizer 271 is connected in signal communication with a second input of the reference picture store 245. An output of the reference picture store 272 is connected in signal communication with a second input of the view synthesizer 271. It is to be appreciated that illumination offset is an optional input and may or may not be used, depending upon the implementation.

An output of a switch 255 is connected in signal communication with a second non-inverting input of the combiner 220. A first input of the switch 255 is connected in signal communication with an output of the disparity compensator 250. A second input of the switch 255 is connected in signal communication with an output of the motion compensator 235. A third input of the switch 255 is connected in signal communication with an output of the intra predictor 230. An output of the mode module 222 is connected in signal communication with the switch 255 for controlling which input is selected by the switch 255. An output of the deblocking filter 225 is available as an output of the decoder. A second input of the virtual reference controller and depth refiner 288 is available as an input to the decoder 200, for receiving an in-band or out-of-band depth signal.

Portions of FIG. 2 may also be referred to as an accessing unit, such as, for example, bitstream parser 202 and any other block that provides access to a particular piece of data or information, either individually or collectively. Similarly, blocks 205, 210, 215, 220, and 225, for example, may be referred to as a decoder or decoding unit, either individually or collectively.

Figure 3:
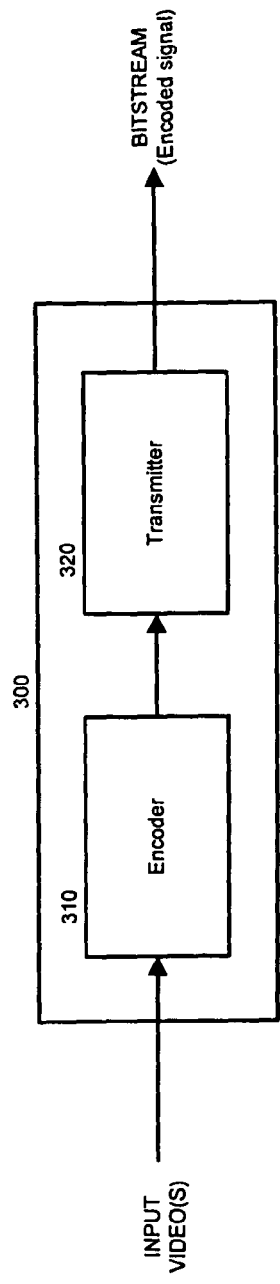
FIG. 3 is a diagram of an implementation of a video transmission system.

FIG. 3 shows an exemplary video transmission system 300 to which the present principles may be applied, in accordance with an implementation of the present principles. The video transmission system 300 may be, for example, a head-end or transmission system for transmitting a signal using any of a variety of media, such as, for example, satellite, cable, telephone-line, or terrestrial broadcast. The transmission may be provided over the Internet or some other network.

The video transmission system 300 is capable of generating and delivering video content encoded using inter-view skip mode with depth. This is achieved by generating an encoded signal(s) including depth information or information capable of being used to synthesize the depth information at a receiver end that may, for example, have a decoder.

The video transmission system 300 includes an encoder 310 and a transmitter 320 capable of transmitting the encoded signal. The encoder 310 receives video information and generates an encoded signal(s) there from using inter-view skip mode with depth. The encoder 310 may be, for example, the encoder 300 described in detail above. The encoder 310 may include sub-modules, including for example an assembly unit for receiving and assembling various pieces of information into a structured format for storage or transmission. The various pieces of information may include, for example, coded or uncoded video, coded or uncoded depth information, and coded or uncoded elements such as, for example, motion vectors, coding mode indicators, and syntax elements.

The transmitter 320 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers. The transmitter may include, or interface with, an antenna (not shown). Accordingly, implementations of the transmitter 320 may include, or be limited to, a modulator.

Figure 4:
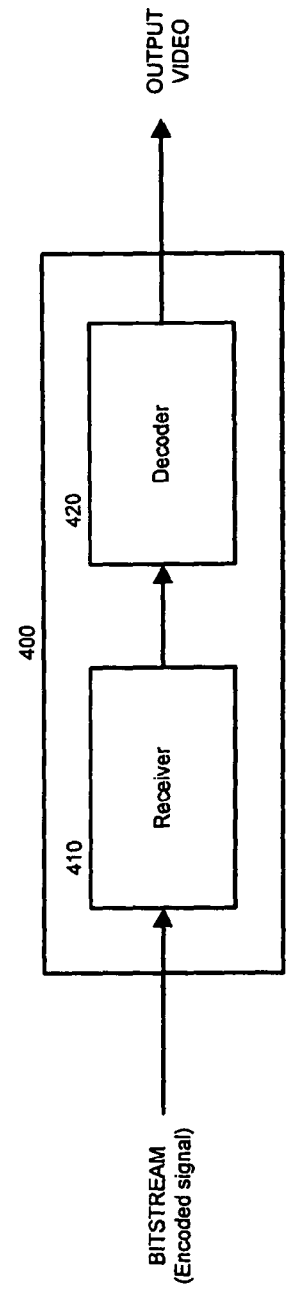
FIG. 4 is a diagram of an implementation of a video receiving system.

FIG. 4 shows an exemplary video receiving system 400 to which the present principles may be applied, in accordance with an embodiment of the present principles. The video receiving system 400 may be configured to receive signals over a variety of media, such as, for example, satellite, cable, telephone-line, or terrestrial broadcast. The signals may be received over the Internet or some other network.

The video receiving system 400 may be, for example, a cell-phone, a computer, a set-top box, a television, or other device that receives encoded video and provides, for example, decoded video for display to a user or for storage. Thus, the video receiving system 400 may provide its output to, for example, a screen of a television, a computer monitor, a computer (for storage, processing, or display), or some other storage, processing, or display device.

The video receiving system 400 is capable of receiving and processing video content including video information. The video receiving system 400 includes a receiver 410 capable of receiving an encoded signal, such as for example the signals described in the implementations of this application, and a decoder 420 capable of decoding the received signal.

The receiver 410 may be, for example, adapted to receive a program signal having a plurality of bitstreams representing encoded pictures. Typical receivers perform functions such as, for example, one or more of receiving a modulated and encoded data signal, demodulating the data signal from one or more carriers, de-randomizing the energy in the signal, de-interleaving the data in the signal, and error-correction decoding the signal. The receiver 410 may include, or interface with, an antenna (not shown). Implementations of the receiver 410 may include, or be limited to, a demodulator.

The decoder 420 outputs video signals including video information and depth information. The decoder 420 may be, for example, the decoder 400 described in detail above.

Figure 5:
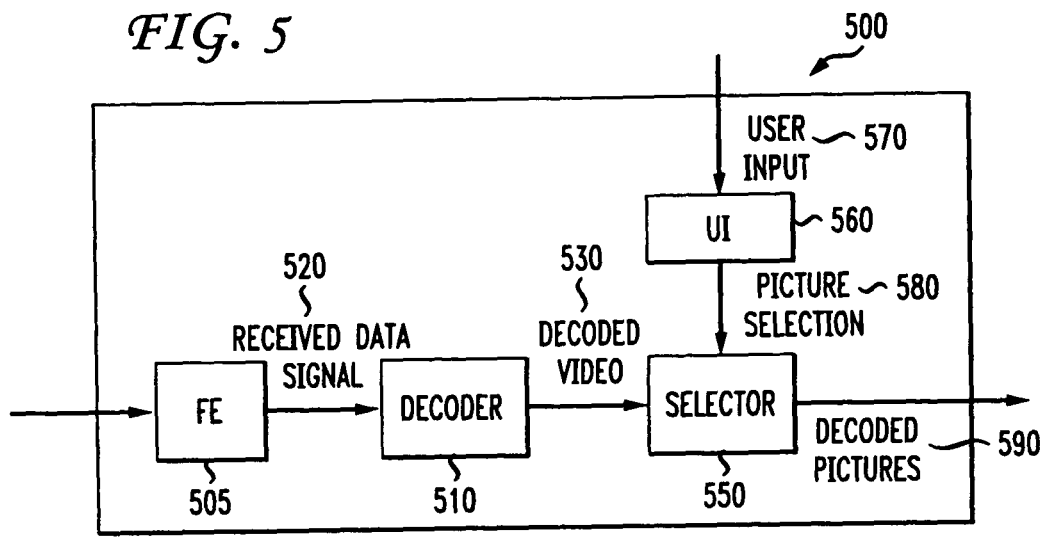
FIG. 5 is a diagram of an implementation of a video processing device.

FIG. 5 shows an exemplary video processing device 500 to which the present principles may be applied, in accordance with an embodiment of the present principles. The video processing device 500 may be, for example, a set top box or other device that receives encoded video and provides, for example, decoded video for display to a user or for storage. Thus, the video processing device 500 may provide its output to a television, computer monitor, or a computer or other processing device.

The video processing device 500 includes a front-end (FE) device 505 and a decoder 510. The front-end device 505 may be, for example, a receiver adapted to receive a program signal having a plurality of bitstreams representing encoded pictures, and to select one or more bitstreams for decoding from the plurality of bitstreams. Typical receivers perform functions such as, for example, one or more of receiving a modulated and encoded data signal, demodulating the data signal, decoding one or more encodings (for example, channel coding and/or source coding) of the data signal, and/or error-correcting the data signal. The front-end device 505 may receive the program signal from, for example, an antenna (not shown). The front-end device 505 provides a received data signal to the decoder 510.

The decoder 510 receives a data signal 520. The data signal 520 may include, for example, one or more Advanced Video Coding (AVC), Scalable Video Coding (SVC), or Multi-view Video Coding (MVC) compatible streams.

AVC refers more specifically to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard" or simply "AVC").

MVC refers more specifically to a multi-view video coding ("MVC") extension (Annex H) of the AVC standard, referred to as H.264/MPEG-4 AVC, MVC extension (the "MVC extension" or simply "MVC").

SVC refers more specifically to a scalable video coding ("SVC") extension (Annex G) of the AVC standard, referred to as H.264/MPEG-4 AVC, SVC extension (the "SVC extension" or simply "SVC").

The decoder 510 decodes all or part of the received signal 520 and provides as output a decoded video signal 530. The decoded video 530 is provided to a selector 550. The device 500 also includes a user interface 560 that receives a user input 570. The user interface 560 provides a picture selection signal 580, based on the user input 570, to the selector 550. The picture selection signal 580 and the user input 570 indicate which of multiple pictures, sequences, scalable versions, views, or other selections of the available decoded data a user desires to have displayed. The selector 550 provides the selected picture(s) as an output 590. The selector 550 uses the picture selection information 580 to select which of the pictures in the decoded video 530 to provide as the output 590.

In various implementations, the selector 550 includes the user interface 560, and in other implementations no user interface 560 is provided because the selector 550 receives the user input 570 directly without a separate interface function being performed. The selector 550 may be implemented in software or as an integrated circuit, for example. In one implementation, the selector 550 is incorporated with the decoder 510, and in another implementation, the decoder 510, the selector 550, and the user interface 560 are all integrated.

In one application, front-end 505 receives a broadcast of various television shows and selects one for processing. The selection of one show is based on user input of a desired channel to watch. Although the user input to front-end device 505 is not shown in FIG. 5, front-end device 505 receives the user input 570. The front-end 505 receives the broadcast and processes the desired show by demodulating the relevant part of the broadcast spectrum, and decoding any outer encoding of the demodulated show. The front-end 505 provides the decoded show to the decoder 510. The decoder 510 is an integrated unit that includes devices 560 and 550. The decoder 510 thus receives the user input, which is a user-supplied indication of a desired view to watch in the show. The decoder 510 decodes the selected view, as well as any required reference pictures from other views, and provides the decoded view 590 for display on a television (not shown).

Continuing the above application, the user may desire to switch the view that is displayed and may then provide a new input to the decoder 510. After receiving a "view change" from the user, the decoder 510 decodes both the old view and the new view, as well as any views that are in between the old view and the new view. That is, the decoder 510 decodes any views that are taken from cameras that are physically located in between the camera taking the old view and the camera taking the new view. The front-end device 505 also receives the information identifying the old view, the new view, and the views in between. Such information may be provided, for example, by a controller (not shown in FIG. 5) having information about the locations of the views, or the decoder 510. Other implementations may use a front-end device that has a controller integrated with the front-end device.

The decoder 510 provides all of these decoded views as output 590. A post-processor (not shown in FIG. 5) interpolates between the views to provide a smooth transition from the old view to the new view, and displays this transition to the user. After transitioning to the new view, the post-processor informs (through one or more communication links not shown) the decoder 510 and the front-end device 505 that only the new view is needed. Thereafter, the decoder 510 only provides as output 590 the new view.

The system 500 may be used to receive multiple views of a sequence of images, and to present a single view for display, and to switch between the various views in a smooth manner. The smooth manner may involve interpolating between views to move to another view. Additionally, the system 500 may allow a user to rotate an object or scene, or otherwise to see a three-dimensional representation of an object or a scene. The rotation of the object, for example, may correspond to moving from view to view, and interpolating between the views to obtain a smooth transition between the views or simply to obtain a three-dimensional representation. That is, the user may "select" an interpolated view as the "view" that is to be displayed.

Returning to a description of the present principles and environments in which they may be applied, it is to be appreciated that advantageously, the present principles may be applied to 3D Video (3DV). 3D Video is a new framework that includes a coded representation for multiple view video and depth information and targets the generation of high-quality 3D rendering at the receiver. This enables 3D visual experiences with auto-multiscopic displays.

Figure 6:
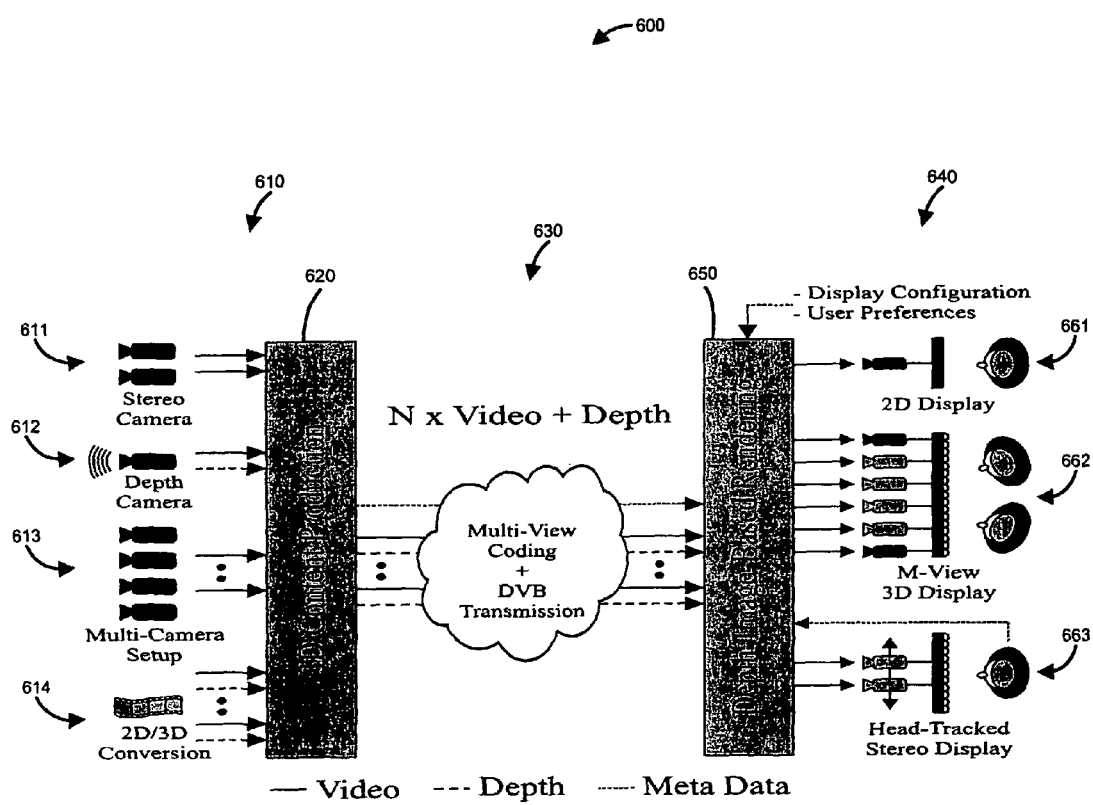
FIG. 6 is a diagram of an implementation of a system for transmitting and receiving multi-view video with depth information.

FIG. 6 shows an exemplary system 600 for transmitting and receiving multi-view video with depth information, to which the present principles may be applied, according to an embodiment of the present principles. In FIG. 6, video data is indicated by a solid line, depth data is indicated by a dashed line, and meta data is indicated by a dotted line. The system 600 may be, for example, but is not limited to, a free-viewpoint television system. At a transmitter side 610, the system 600 includes a three-dimensional (3D) content producer 620, having a plurality of inputs for receiving one or more of video, depth, and meta data from a respective plurality of sources. Such sources may include, but are not limited to, a stereo camera 611, a depth camera 612, a multi-camera setup 613, and 2-dimensional/3-dimensional (2D/3D) conversion processes 614. One or more networks 630 may be used for transmit one or more of video, depth, and meta data relating to multi-view video coding (MVC) and digital video broadcasting (DVB).

At a receiver side 640, a depth image-based renderer 650 performs depth image-based rendering to project the signal to various types of displays. The depth image-based renderer 650 is capable of receiving display configuration information and user preferences. An output of the depth image-based renderer 650 may be provided to one or more of a 2D display 661, an M-view 3D display 662, and/or a head-tracked stereo display 663.

Figure 7:
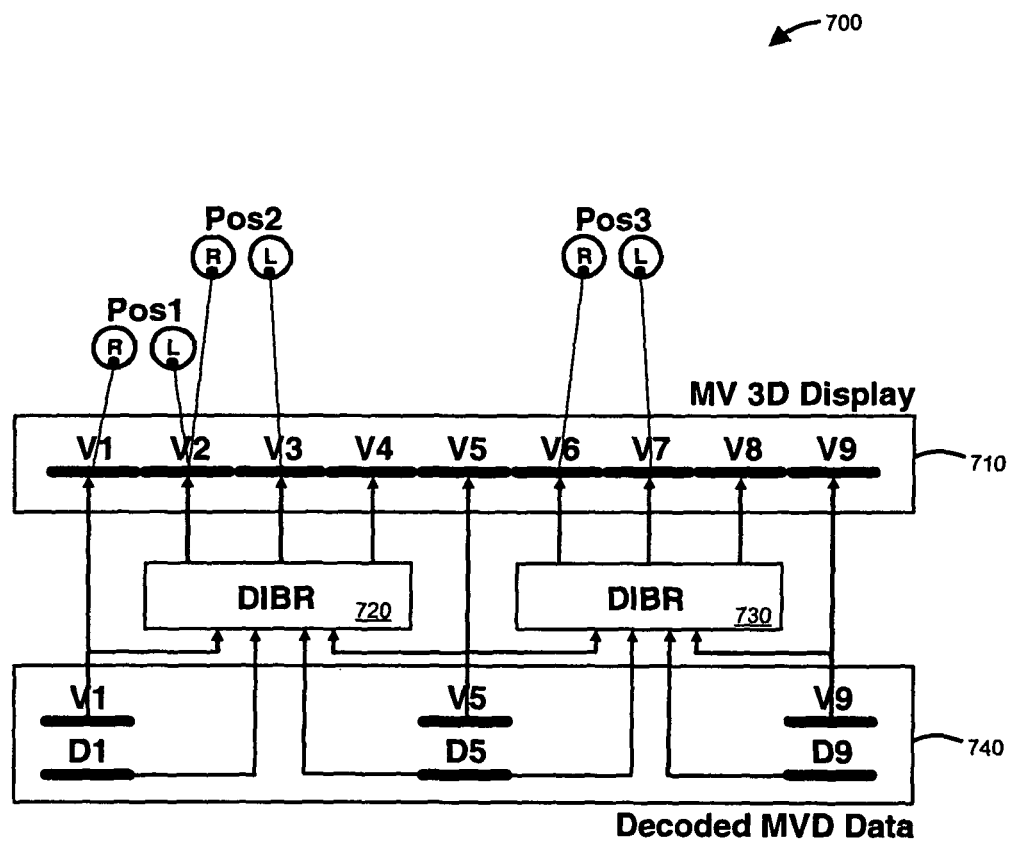
FIG. 7 is a diagram of an implementation of a framework for generating nine output views (N=9) out of 3 input views with depth (K=3).

In order to reduce the amount of data to be transmitted, the dense array of cameras (V1, V2 ... V9) may be sub-sampled and only a sparse set of cameras actually capture the scene. FIG. 7 shows an exemplary framework 700 for generating nine output views (N=9) out of 3 input views with depth (K=3), to which the present principles may be applied, in accordance with an embodiment of the present principles. The framework 700 involves an auto-stereoscopic 3D display 710, which supports output of multiple views, a first depth image-based renderer 720, a second depth image-based renderer 730, and a buffer for decoded data 740. The decoded data is a representation known as Multiple View plus Depth (MVD) data. The nine cameras are denoted by V1 through V9. Corresponding depth maps for the three input views are denoted by D1, D5, and D9. Any virtual camera positions in between the captured camera positions (e.g., Pos 1, Pos 2, Pos 3) can be generated using the available depth maps (D1, D5, D9), as shown in FIG. 7. As can be seen in FIG. 7, the baseline between the actual cameras (V1, V5 and V9) used to capture data can be large. As a result, the correlation between these cameras is significantly reduced and coding efficiency of these cameras may suffer since the coding efficiency would only rely on temporal correlation. Moreover, as shown in FIG. 7, views 2, 3, 4, 6, 7 and 8 are skipped in coding. On one hand, in order to reconstruct the missed views, the decoder will use view 1, 5 and 9 and their depth images. Note that the depth images for view 5 are obtained for rendering the missed views. On the other hand, in order to encode view 1 and view 9 based on view 5, a different depth image for view 5 may be identified. Thus, two different depth images for view 5 will be coded. In at least one implementation, we propose to code the refinement on the original depth images for coding other views.

Moreover, in at least one implementation, instead of simply skipping the coding of certain views, the encoder can send the residual signal for selected pictures or views among the skipped views (i.e., views 2, 3, 4, 6, 7 and 8 in FIG. 7) to enhance the rendering quality.

In a first embodiment, and variations of this embodiment, the original depth images target for the best rendering quality. The original depth images are delivered to the receiver side so as to be utilized by the 3D display based on DIBR. Any multi-view video coding framework can be used for the encoding and transmission of the original depth map, e.g., MPEG-C part III, or the 3DV under development.

Figure 8:
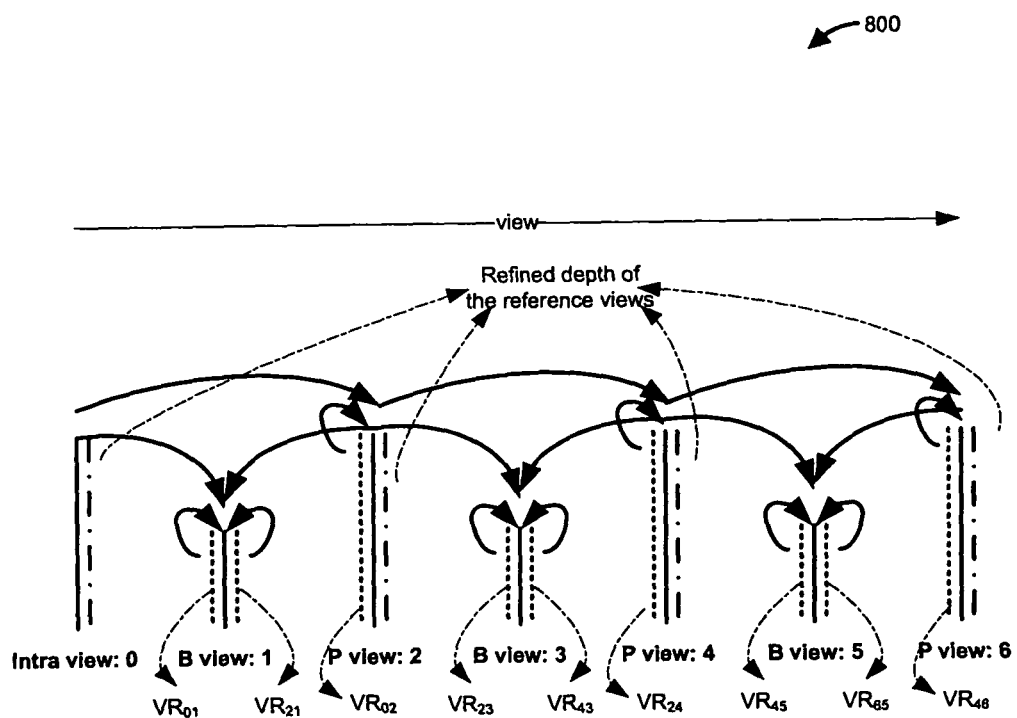
FIG. 8 is a diagram of an example of using a refined depth map to create a virtual reference view.

Assuming that the coded depth images are accessible at the multi-view video encoder and decoder, it is possible to use a synthesized view as a reference to predict the current view. Considering that the original depth images are not optimized for coding of a multi-view video signal, we propose to signal a modification on the depth images so as to minimize the prediction error between a synthesized reference view and the current view. In one embodiment, it is proposed to signal one depth refinement for each view that is used as a reference. FIG. 8 shows an example 800 of using a refined the depth map to create a virtual reference view, in accordance with an embodiment of the present principles. In FIG. 8, $VR_{xy}$ represents a virtual reference, synthesized from view x to view y using the refined depth of view x. In one example shown in FIG. 8, apart from view 0, view 2 has an additional reference view, virtual view 2, which is synthesized from view 0 using the refined depth map of view 0. On the other hand, using the same refined depth map of view 0, virtual view 1 is generated as an additional reference for view 1. In this embodiment, the depth map refinement is associated with the reference views. In FIG. 8, each view among views 0, 2, 4 and 6 has one associated refined depth map, while views 1, 3, and 5 have no associated refined depth map.

Figure 9:
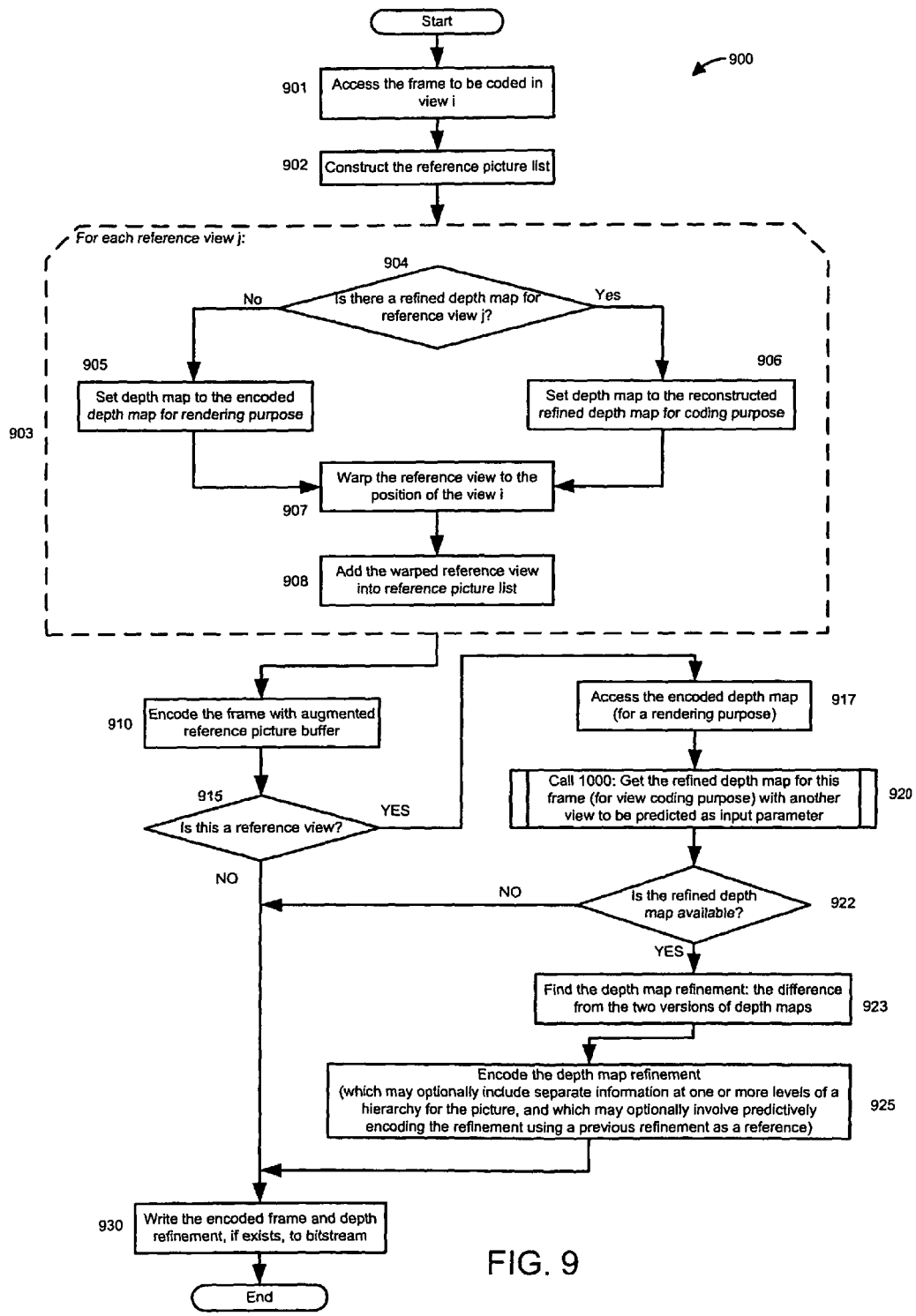
FIG. 9 is a diagram of an implementation of an encoding process.
Figure 10:
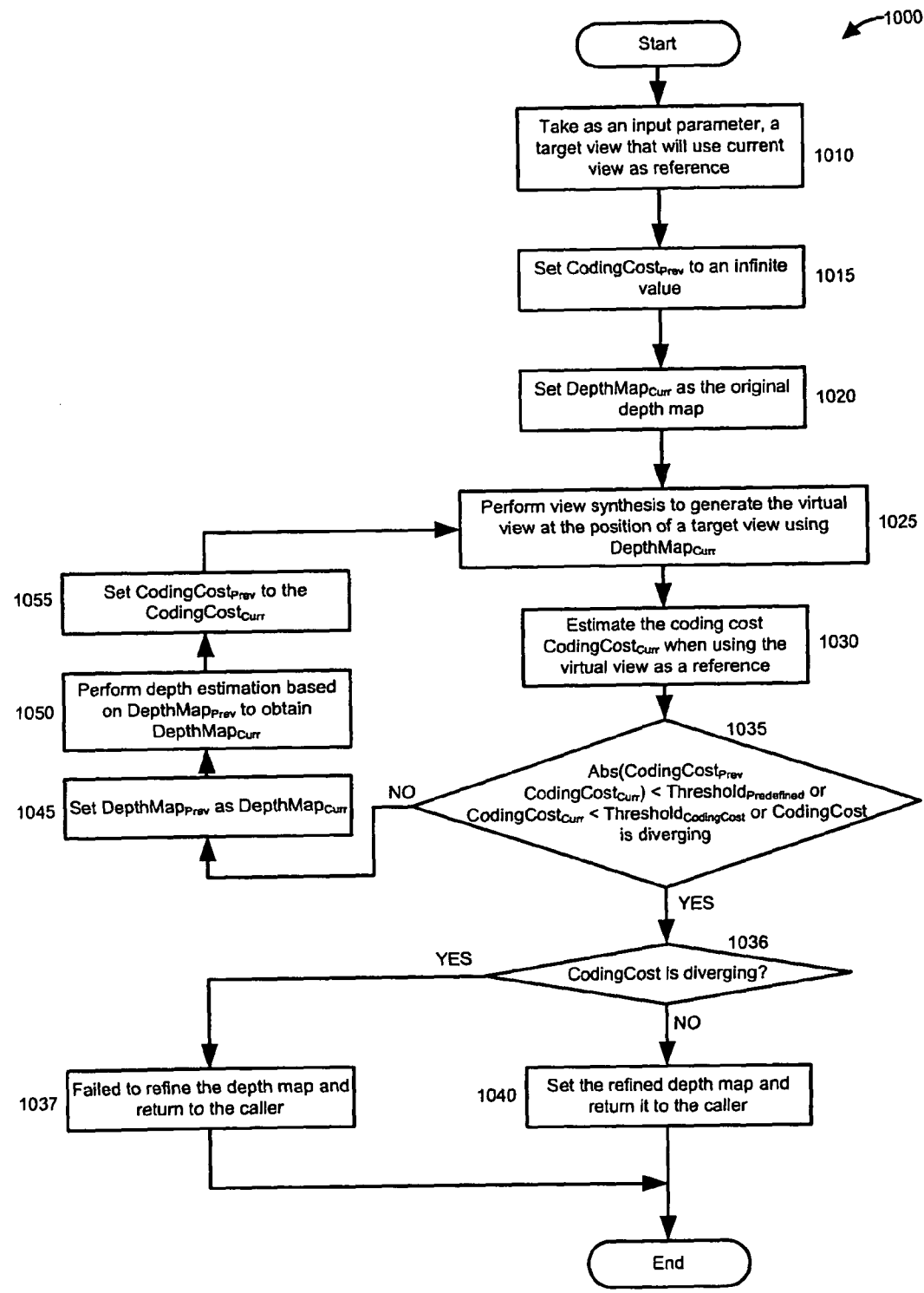
FIG. 10 is a diagram further illustrating step 920 of FIG. 9 and step 1210 of FIG. 12.

It is proposed to use an iterative way to refine the depth map as shown in FIGS. 9 and 10 to improve the encoding efficiency.

FIG. 9 shows an exemplary method 900 for encoding a frame, in accordance with an embodiment of the present principles. At step 901, the frame to be coded in view i is accessed. At step 902, the reference picture list is constructed. At step 903, a loop is performed over each reference view j to construct and add a warped reference view into the reference picture list. Thus, it is to be appreciated that step 908 may pass control to step 904, not step 910 if the loop is not finished. At step 904, it is determined whether or not there is a refined depth map for reference view j. If so, then control is passed to a step 906. Otherwise, control is passed to a step 905.

At step 906, the depth map is set to the reconstructed depth map for a coding purpose. At step 907, the reference view is warped to the position of view i. At step 908, the warped reference view is added to the reference picture list. At step 910, the frame is encoded with the augmented reference picture buffer. At step 915, it is determined whether or not the current view is a reference view. If so, then control is passed to a step 917. Otherwise, control is passed to a step 930.

At step 917, the encoded depth map (for a rendering purpose) is accessed. At step 920, a call 1000 (i.e., to method 1000 of FIG. 10) is made, which involves getting the refined depth map for this frame (for a view coding purpose) with another view to be predicted as an input parameter. At step 922, is it determined whether or not the refined depth map is available. If so, then control is passed to a step 923. Otherwise, control is passed to the step 930.

At step 923, the depth map refinement, namely the difference from the two versions of the depth maps, is found. At step 925, the depth map refinement is encoded.

At step 930, the encoded frame and the depth refinement if it exists (i.e., is available) are written to a bitstream.

At step 905, the depth map is set to the encoded depth map for a rendering purpose.

It is to be appreciated that, in an embodiment, step 925 may involve, for example, predictively encoding the refinement using a previous refinement as a reference.

It is to be further appreciated that, in an embodiment, step 925 may involve, for example, the refinement including separate information at one of more levels of a hierarchy for the picture. The hierarchy may include two or more of a pixel level, a partition level, a macroblock level, a slice level, and a picture level. Moreover, in an embodiment, the refinement includes a separate value for each pixel represented by the refinement. Further, in an embodiment, the refinement includes a separate value for each macroblock represented by the refinement, where the separate value for a given macroblock applies to each pixel within the given macroblock.

It is to be also appreciated that, in an embodiment, one or more of the depth information for the picture, the modified depth information for the picture, and the refinement, apply only to a portion of the picture.

FIG. 10 shows an exemplary method 1000 for refining a depth map, in accordance with an embodiment of the present principles. The method 1000 may be considered as one exemplary implementation of step 920 of method 900 of Figure. 9 and step 1210 of method 1200 of FIG. 12. At step 1010, a target view that will use the current view as a reference is taken as an input parameter. At step 1015, CodingCost$_{prev}$ is set to an infinite value. At step 1020, DepthMap$_{curr}$ is set as the original depth map. At step 1025, view synthesis is performed to generate the virtual view at the position of a target view using DepthMap$_{curr}$. At step 1030, the coding cost CodingCost$_{curr}$ is estimated when using the virtual view view as a reference. At step 1035, it is determined whether or not Abs (CodingCost$_{prev}$-CodingCost$_{curr}$) <Threshold$_{predefined}$ or CodingCost$_{curr}$ <Threshold$_{CodingCost}$ or CodingCost is diverging. If so (regarding any of the preceding three conditions), then control is passed to a step 1036. Otherwise, control is passed to a step 1045.

At step 1036, it is determined whether or not CodingCost is diverging. If so, then control is passed to a step 1037. Otherwise, control is passed to a step 1040. At step 1037, it is ascertained that refining the depth map has failed and a return is made to the caller (i.e., step 920 of method 900 of FIG. 9).

At step 1045, DepthMap$_{prev}$, is set as DepthMap$_{curr}$. At step 1050, depth estimation is performed based on DepthMap$_{prev}$ to obtain DepthMap$_{curr}$. At step 1055, CodingCost$_{prev}$ is set to CodingCost$_{curr}$.

At step 1040, the refined depth map is set and returned to the caller (i.e., step 920 of method 900 of FIG. 9).

Thus, in method 1000, the depth estimation, view synthesis, and coding cost estimation are repeated until the change of the coding cost falls within a threshold value or the coding cost is smaller than Threshold$_{codingcost}$ or the coding cost is found to be diverging. This is a time-consuming procedure since depth estimation and view synthesis are complex.

As for the coding of the depth refinement, several solutions can be selected. In one example, the modification of the depth map can be coded using an existing video coding standard like AVC. In another example, we can treat the depth refinement as a third video component and code it together with the video signal. In another example, MVC can be used to code the multi-view depth refinement.

In another embodiment, the depth signal can be scalably coded and, thus, different operating points can be extracted for different purposes. As an example, if only view synthesis is required, then a lower operating point (corresponding to a lower quality depth map may be extracted). Otherwise, if both view synthesis and virtual reference view generation are required, then a higher operating point (corresponding to a higher quality depth map) may be extracted.

Figure 17:
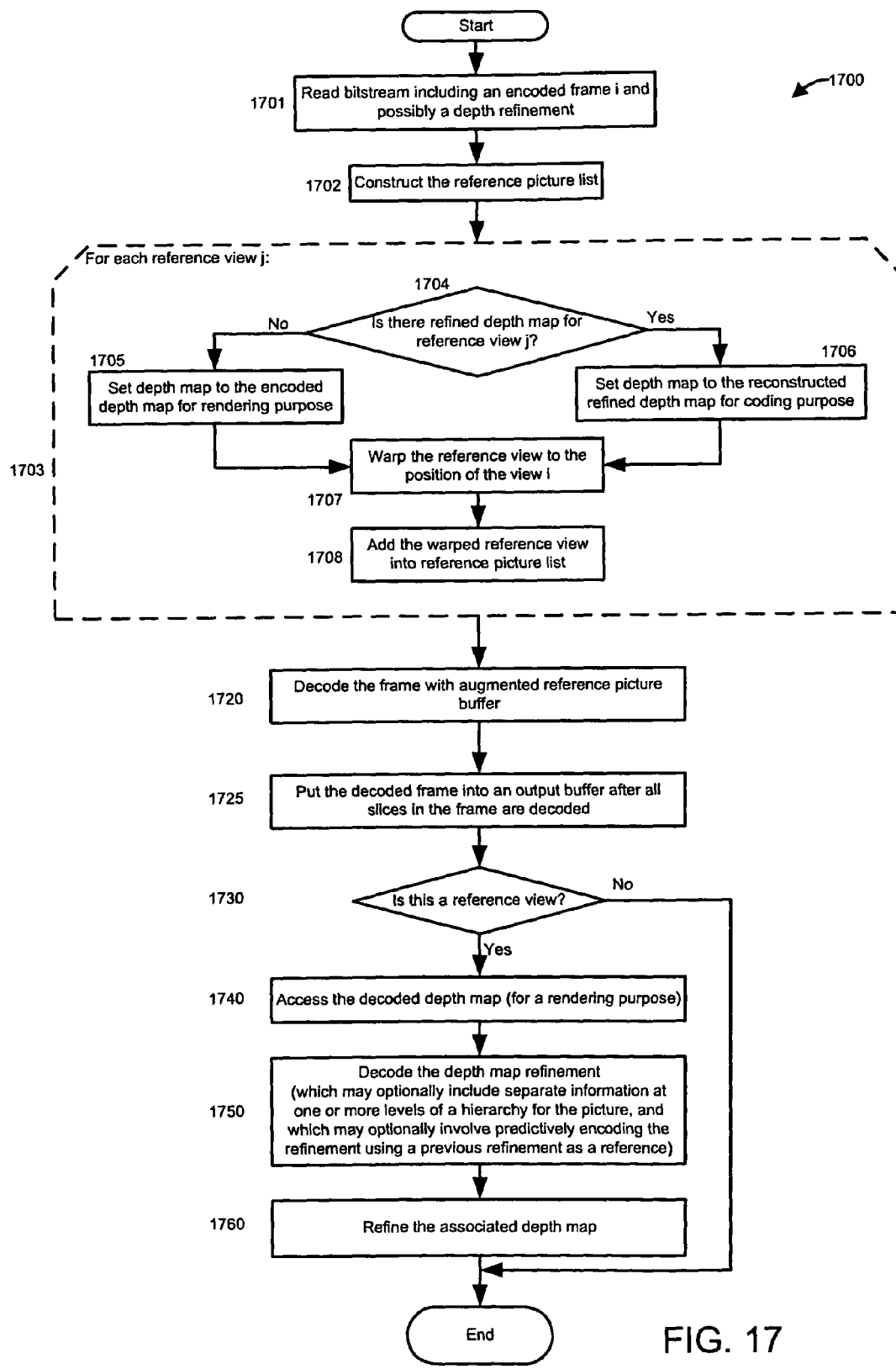
FIG. 17 is a diagram of an implementation of a decoding process.

FIG. 17 shows an exemplary method 1700 for decoding a frame, in accordance with an embodiment of the present principles. The method 1700 may be performed, for example, to decode frames encoded using method 900 of FIG. 9.

At step 1701, a bitstream including an encoded frame i and possible a depth refinement is read. At step 1702, a reference picture list is constructed. At step 1703, a loop is performed over each reference view j to construct and add a warped reference view into the reference picture list. Thus, it is to be appreciated that step 1708 may pass control to step 1704, not step 1720 if the loop is not finished. At step 1704, it is determined whether or not there is a refined depth map for reference view j. If so, then control is passed to a step 1706. Otherwise, control is passed to a step 1705.

At step 1706, a depth map is set to the reconstructed refined depth map for a coding purpose. At step 1707, the reference view is warped to the position of view i. At step 1708, the warped reference view is added into the reference picture list. A step 1720, the frame is decoded with an augmented reference picture buffer. At step 1725, the decoded frame is put into an output buffer after all slices in the frame are decoded. At step 1730, it is determined whether or not the current, view is a reference view. If so, then control is passed to a step 1740. Otherwise, the method is terminated.

At step 1740, the decoded depth map (for a rendering purpose) is accessed. At step 1750, the depth map refinement is decoded. At step 1760, the associated depth map is refined.

At step 1705, the depth map is set to the encoded depth map for a rendering purpose.

It is to be appreciated that, in an embodiment, step 1750 may involve, for example, predictively encoding the refinement using a previous refinement as a reference.

It is to be also appreciated that, in an embodiment, one or more of the depth information for the picture, the modified depth information for the picture, and the refinement, apply only to a portion of the picture.

Figure 16:
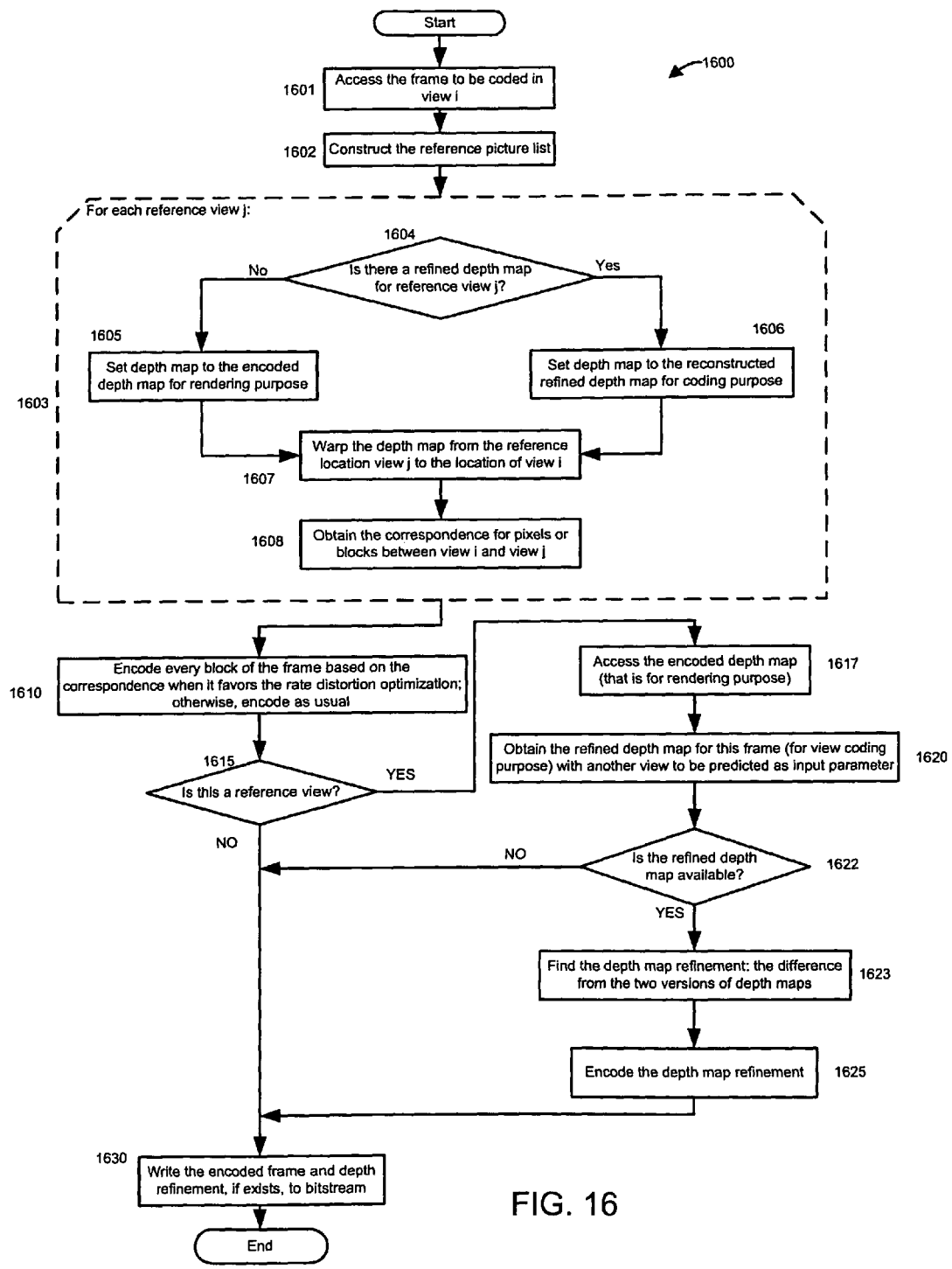
FIG. 16 is a diagram of an implementation of an encoding process.
Figure 18:
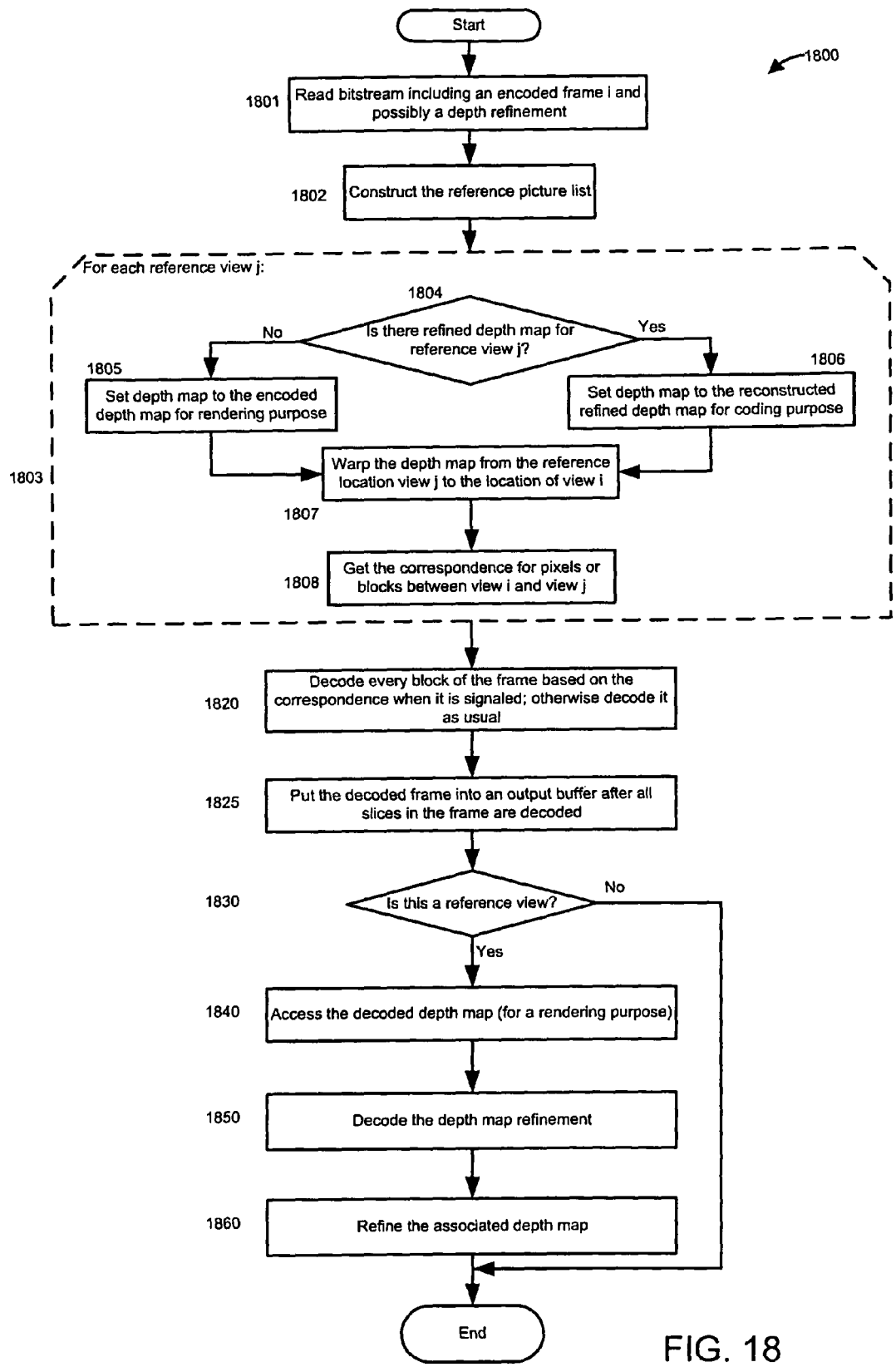
FIG. 18 is a diagram of an implementation of a decoding process.

The following methods 1600 and 1800, corresponding to FIGS. 16 and 18, respectively, are similar to methods 900 and 1700, respectively, but with steps 1610 and 1820 modified (with respect to their counterparts 910 and 1720) in accordance with an embodiment of the present principles.

FIG. 16 shows an exemplary method 1600 for encoding a slice using a refined depth of a current view, in accordance with an embodiment of the present principles. At step 1601, the frame to be coded in view i is accessed. At step 1602, the reference picture list is constructed. At step 1603, a loop is performed over each reference view j to construct and add a warped reference view into the reference picture list. Thus, it is to be appreciated that step 1608 may pass control to step 1604, not step 1610 if the loop is not finished. At step 1604, it is determined whether or not there is a refined depth map for reference view j. If so, then control is passed to a step 1606. Otherwise, control is passed to a step 1605.

At step 1606, the depth map is set to the reconstructed refined depth map for a coding purpose. At step 1607, the depth map from the reference location view j is warped to the location of view i. At step 1608, the correspondence for pixels of blocks between view i and view j is obtained. At step 1610, every block of the frame is encoded based on the correspondence when it favors rate distortion optimization, otherwise every block of the frame is encoded in the usual manner (for example, in accordance with a particular standard, recommendation, and/or so forth). At step 1615, it is determined whether or not the current view is a reference view. If so, then control is passed to a step 1617. Otherwise, control is passed to a step 1630.

At step 1617, the encoded depth map (for a rendering purpose) is accessed. At step 1620, the refined depth map for this frame (for a view coding purpose) is obtained with another view to be predicted as an input parameter. At step 1622, it is determined whether or not a refined depth map is available. If so, then control is passed to a step 1623. Otherwise, control is passed to a step 1630.

At step 1623, the depth map refinement, namely the difference from the two versions of depth maps, is found. At step 1625, the depth map refinement is encoded.

At step 1630, the encoded frame and the depth refinement if it exists (i.e., is available) are written to a bitstream.

At step 1605, the depth map is set to the encoded depth map for a rendering purpose.

FIG. 18 shows an exemplary method 1800 for decoding a frame, in accordance with an embodiment of the present principles. At step 1801, a bitstream including an encoded frame i and possible a depth refinement is read. At step 1802, a reference picture list is constructed. At step 1803, a loop is performed over each reference view j to construct and add a warped reference view into the reference picture list. Thus, it is to be appreciated that step 1808 may pass control to step 1804, not step 18210 if the loop is not finished. At step 1804, it is determined whether or not there is a refined depth map for reference view j. If so, then control is passed to a step 1806. Otherwise, control is passed to a step 1805.

At step 1806, a depth map is set to the reconstructed refined depth map for a coding purpose. At step 1807, the depth map from the refererice location view j is warped to the location of view i. At step 1808, correspondence for pixels or blocks between view i and view j is obtained. A step 1820, every block of the current frame is decoded based on the correspondence when it is signaled, otherwise every block is decoded in the usual manner (for example, in accordance with a particular standard, recommendation, and/or so forth). At step 1825, the decoded frame is put into an output buffer after all slices in the frame are decoded. At step 1830, it is determined whether or not the current view is a reference view. If so, then control is passed to a step 1840. Otherwise, the method is terminated.

At step 1840, the decoded depth map (for a rendering purpose) is accessed. At step 1850, the depth map refinement is decoded. At step 1860, the associated depth map is refined.

At step 1805, the depth map is set to the encoded depth map for a rendering purpose.

Figure 11:
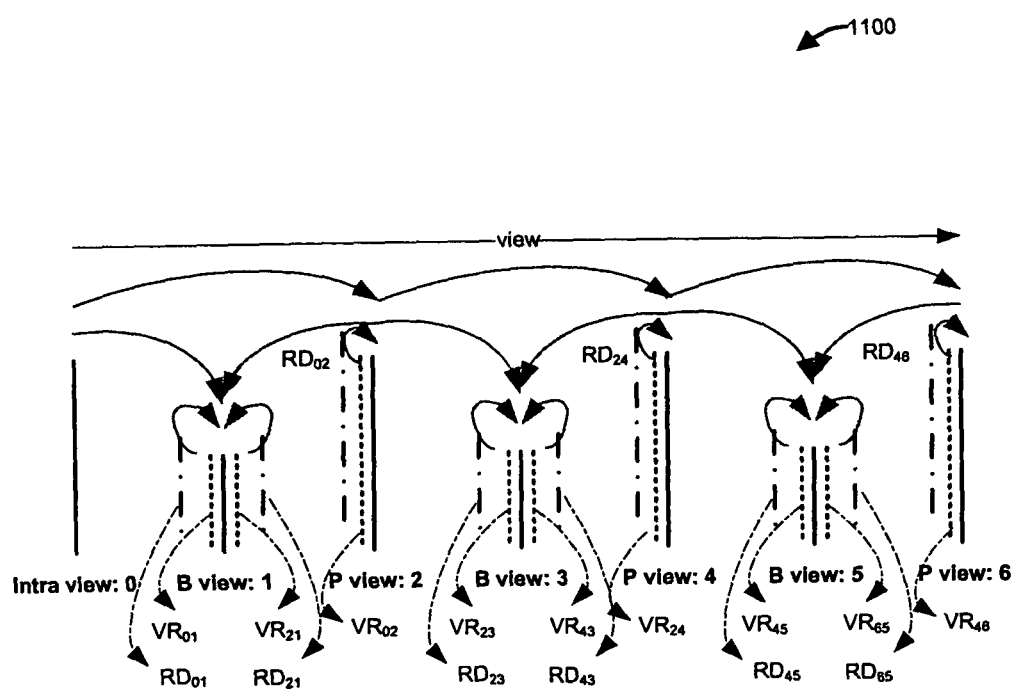
FIG. 11 is a diagram of another example of using a refined depth map to create a virtual reference view.

In a second embodiment, and variations of the second embodiment, it is proposed to signal more than one depth refinement for the same reference view when it is warped to different positions to predict different views. In this case, the depth map refinement will be associated with the view to be coded and identified by a reference index. FIG. 11 shows another example 1100 of using a refined depth map to create a virtual reference view, in accordance with an embodiment of the present principles. In FIG. 11, $RD_{xy}$ represents a refined depth map of view x to generate a synthesized view to predict view y, $VR_{xy}$. $VR_{xy}$ represents a virtual reference, synthesized from view x to view y using the refined depth of view x. In one example shown in FIG. 11, view 2 is associated with one refined depth that originates from view 0, while view 1 is associated with two refined depth maps that originate from view 0 and view 2, respectively. That is, the depth of view 0 has two refined versions. This embodiment provides more flexibility to achieve the depth map refinement compared to embodiment 1 and, thus, benefits the coding efficiency.

Figure 12:
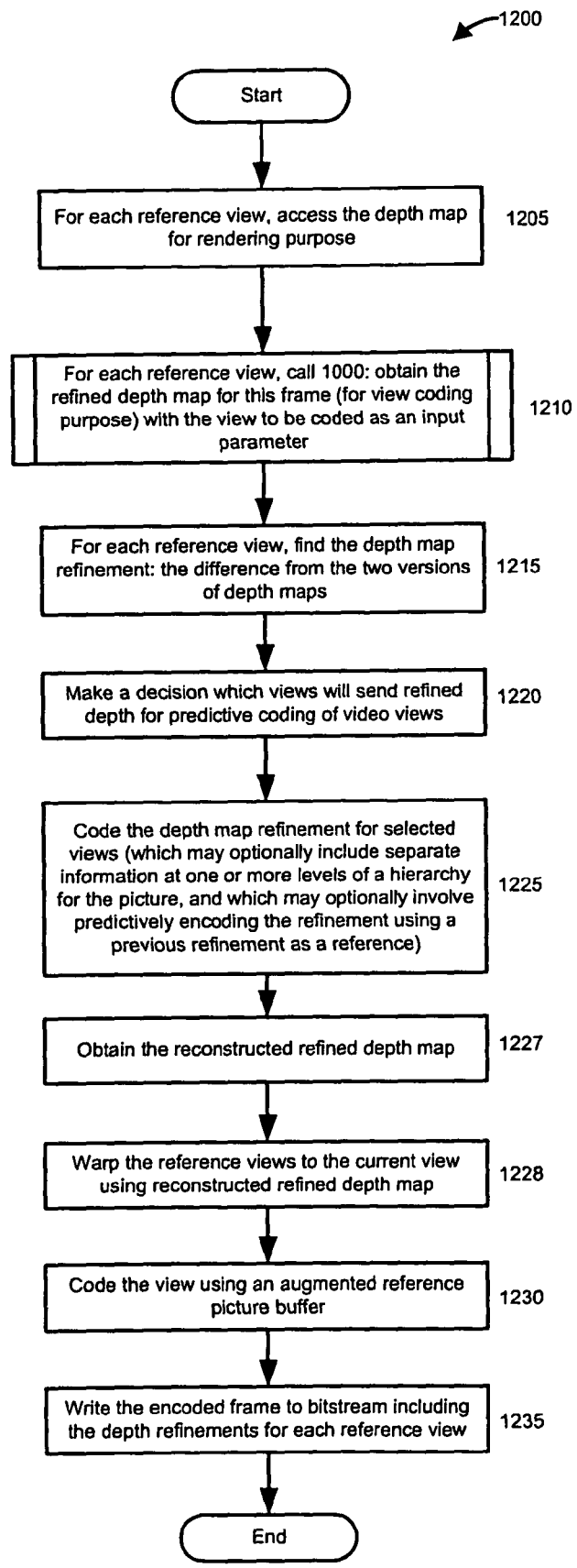
FIG. 12 is a diagram of an implementation of an encoding process.

FIG. 12 shows an exemplary method 1200 for encoding a P or B slice with additional reference views generated based on a refined depth map, in accordance with an embodiment of the present principles. At step 1205, for each reference view, the depth map for a rendering purpose is accessed. At step 1210, for each reference view, call 1000 is made, which involves obtaining the refined depth map for this frame (for a view coding purpose) with the view to be coded as an input parameter. At step 1215, for each reference view, the depth map refinement, namely the difference from the two versions of the depth maps, is found. At step 1220, a decision is made regarding which views will send refined depth for predictive coding of video views. At step 1225, the depth map refinement for the selected views is coded. At step 1227, obtain the reconstructed refined depth map. At step 1228, the reference views are warped to the current view using a reconstructed refined depth map. At step 1230, the view is coded using an augmented reference picture buffer. At step 1235, the encoded frame including the depth refinements for each reference view are written to a bitstream.

It is to be appreciated that, in an embodiment, step 1225 may involve, for example, predictively encoding the refinement using a previous refinement as a reference.

It is to be further appreciated that, in an embodiment, step 1225 may involve, for example, the refinement including separate information at one of more levels of a hierarchy for the picture. The hierarchy may include two or more of a pixel level, a partition level, a macroblock level, a slice level, and a picture level Moreover, in an embodiment, the refinement includes a separate value for each pixel represented by the refinement. Further, in an embodiment, the refinement includes a separate value for each macroblock represented by the refinement, where the separate value for a given macroblock applies to each pixel within the given macroblock.

It is to be also appreciated that, in an embodiment, one or more of the depth information for the picture, the modified depth information for the picture, and the refinement, apply only to a portion of the picture.

With respect to step 1215 of the method 1200 of FIG. 12, we propose to take the coding cost as the criteria to refine the depth map for each reference view. From a compression point-of-view, maybe not all of the refined depth map can benefit the coding of the current view, so a decision will be made if the refined depth map of a reference view is useful and is to be transmitted. For the selected reference views, we propose to place the corresponding virtual reference in the front of the reference buffer, that is, they are assigned with lower reference indexes. Alternatively, this can be signaled at another higher level including, but not limited to, e.g. sequence parameter set, or picture parameter set. In an implementation, the above mentioned criteria may include, but is not limited to, one or more of the following: (1) cost function is not more than a threshold amount lower than the last cost function; (2) cost function is not below a threshold; and (3) cost function has not gone up, or has not gone up more than a threshold number of times, or has not gone up more than a threshold amount or percentage.

Figure 13:
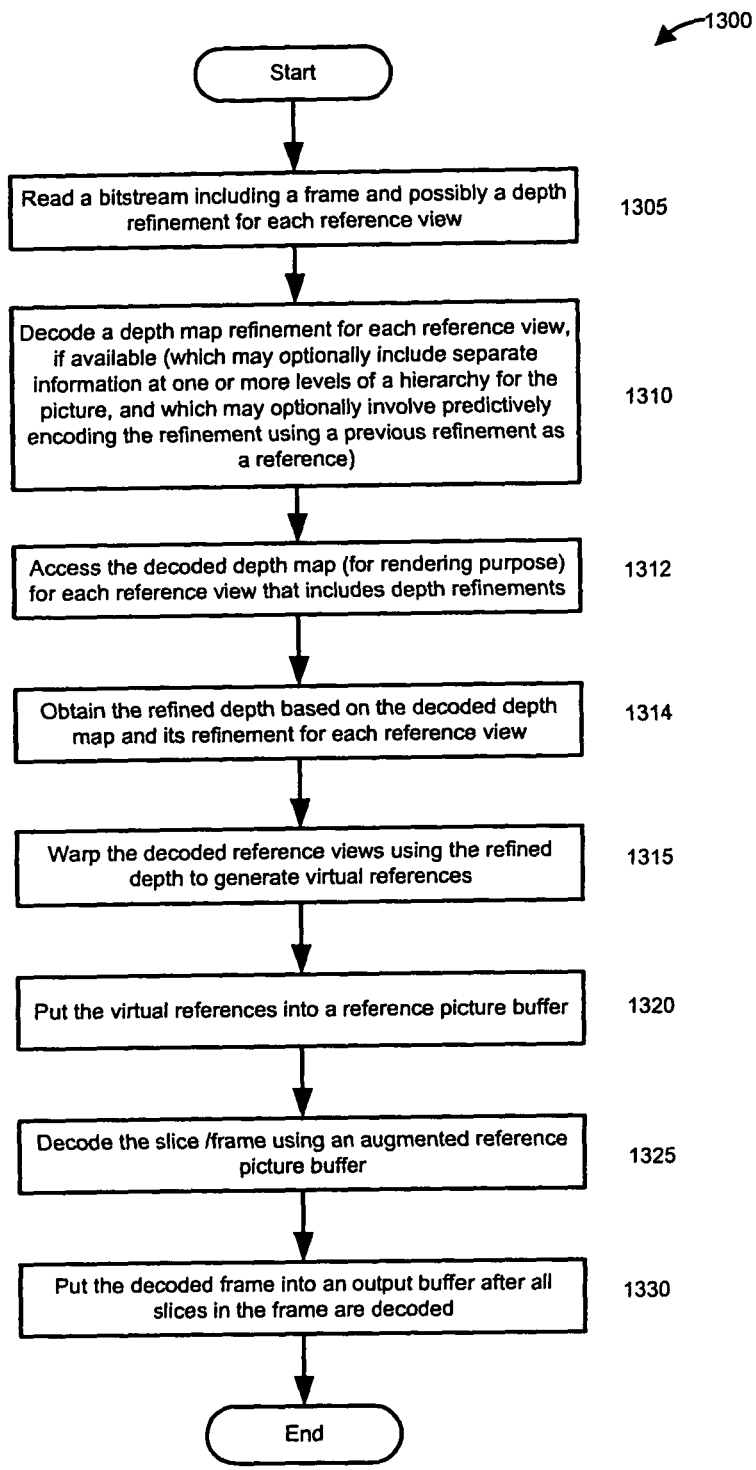
FIG. 13 is a diagram of an implementation of a decoding process.

FIG. 13 shows an exemplary method 1300 for decoding a P or B slice that may be predicted by a virtual reference view generated from a refined depth map, in accordance with an embodiment of the present principles. At step 1305, a bitstream including a frame and possibly a depth refinement for each reference view is read. At step 1310, a depth map refinement, if available, is decoded for each reference view. At step 1312, the decoded depth map (for a rendering purpose) is accessed for each reference view that includes depth refinements; At step 1314, the refined depth is obtained based on the decoded depth map and its refinement for each reference view. At step 1315, the decoded reference views are warped using the refined depth to generate virtual references. At step 1320, the virtual references are put into a reference picture buffer. At step 1325, the frame (or a slice in the frame) is decoded using an augmented reference picture buffer. At step 1330, the decoded frame is put into an output buffer after all slices in the frame are decoded.

It is to be appreciated that, in an embodiment, step 1310 may involve, for example, predictively encoding the refinement using a previous refinement as a reference.

It is to be also appreciated that, in an embodiment, one or more of the depth information for the picture, the modified depth information for the picture, and the refinement, apply only to a portion of the picture.

In a third embodiment, and variations of the third embodiment, it is proposed to perform the refinement of depth information and the signaling of depth information at one or more of various different levels. Such levels may include, for example, a pixel, a partition, a macroblock, a slice, a picture, a field, and a frame. Accordingly, although refinement of depth information may be performed for an entire picture (for example, a field or a frame) at the same time, it may also (or alternatively) be performed for less than the entire picture.

In many implementations, known techniques are used to generate a refinement of depth information, possibly generating a different refinement at each of several iterations. Such techniques may be used to generate a refinement for an entire depth map for a picture. Likewise, such techniques may be used, or extrapolated, to generate a refinement for depth information relating to less than an entire picture. Such techniques may focus depth refinement on, for example, particular regions such as, for example, flat regions or regions of high depth-discontinuity.

One variation of the third embodiment follows. An interview skip mode was proposed for multi-view video coding (MVC). A single depth value will be derived for each block by some implicit way. For example, it was proposed to set the depth of a block as the depth of the upper-left pixel. Then a 3D projection procedure based on the camera parameters and the depth information will identify a corresponding block from the neighboring view. If the corresponding block resembles the current block to a sufficient degree, then the interview skip mode will be signaled in the bitstream and the current block will be skipped for further encoding.

However, a fixed implicit derivation of the depth for a block may not be always efficient. In this embodiment, a refinement on a certain derived depth value is proposed to be transmitted as an enhanced option. The signaling of the depth refinement can be designed in a hierarchical way, for example, it can appear at different levels including, but not limited to, for example: slice; macroblock (16×16); or sub-block (16×8, 8×16, 8×8, 8×4, 4×8, or 4×4). In at least one implementation, a syntax element depthf indicates the depth refinement. More specifically, depthf can indicate the selected depth refinement directly (see, e.g., FIGS. 9 and 10), or even the difference between the prediction of depth refinement and the selected depth refinement.

In other implementations, the depth refinement for a given portion (for example, the current macroblock) is signaled as a difference from the depth refinement for a first portion (for example, the first macroblock of the picture or of the slice). Thus, if the depth refinement for a series of macroblocks is within a small range, even if relatively large in absolute value, then after the first refinement is signaled only a few bits need to be allocated to transmitting the remaining depth refinements for that series.

Various implementations also use one or more neighbors to predict a depth refinement. The neighbor(s) may include, for example, all or part of (i) a temporally neighboring picture, (ii) a spatially neighboring macroblock, and (iii) a neighboring view from the same or a different instant in time.

The inter-view skip mode with depth refinement is signaled, in at least one implementation, by depth_skip_flag in the syntax.

Figure 14:
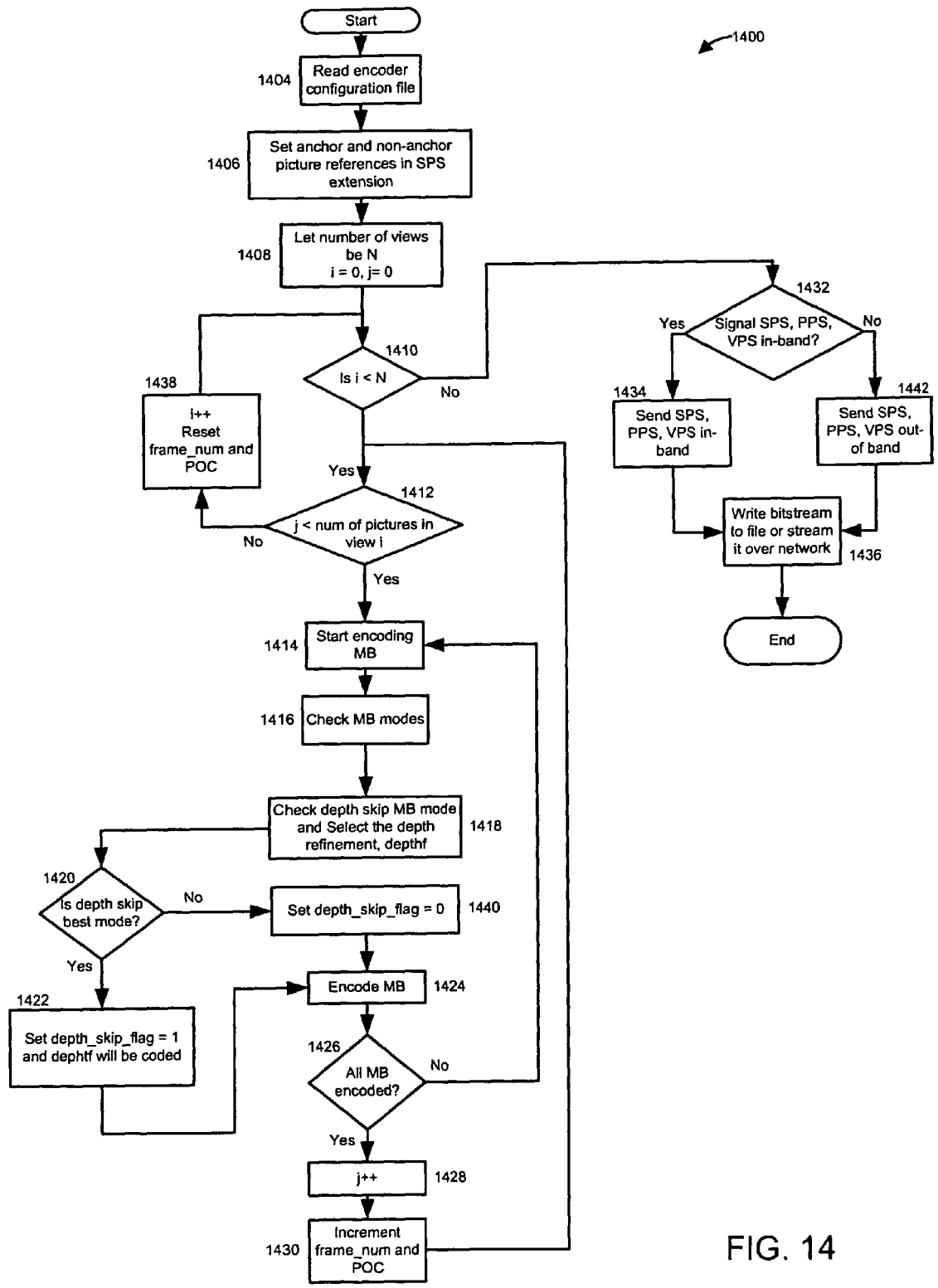
FIG. 14 is a diagram of an implementation of an encoding process.

FIG. 14 shows an exemplary method 1400 for encoding a slice using a refined depth of a current view, in accordance with an embodiment of the present principles. At step 1404, anchor and non-anchor picture references are set in the SPS extension. At step 1408, the number of views is represented by a variable N, and variables i and j are initialized to zero. At step 1410, it is determined whether or not i is less then N. If so, then control is passed to a step 1412. Otherwise, control is passed to a step 1432.

At step 1412, it is determined whether or not j is less than the number of pictures in view i. If so, then control is passed to a step 1414. Otherwise, control is passed to a step 1438.

At step 1414, encoding of the current macroblock is started. At step 1416, macroblock modes are checked. At step 1418, depth skip macroblock mode is checked, and the depth refinement, depthf, is selected. At step 1420, it is determined whether or not depth skip is the best mode. If so, then control is passed to a step 1422. Otherwise, control is passed to a step 1440.

At step 1422, depth_skip_flag is set to one, and depthf is coded.

At step 1424, the current macroblock is encoded. At step 1426, it is determined whether or not all macroblocks have been encoded. If so, then control is passed to a step 1428. Otherwise, control is returned to step 1414.

At step 1428, variable j is incremented. At step 1430, frame_num and picture order count (POC) are incremented.

At step 1438, variable i is incremented, and frame_num and POC are reset.

At step 1440, depth_skip_flag is set to zero.

At step 1432, it is determined whether or not to signal the sequence parameter set (SPS), picture parameter set (PPS), and view parameter set (VPS) in-band. If so, then control is passed to a step 1434. Otherwise, control is passed to a step 1442.

At step 1434, the SPS, PPS, and VPS are signaled in-band. At step 1436, the bitstream is written to a file or streamed over a network.

At step 1442, the SPS, PPS, and VPS are signaled out-of-band.

Figure 15:
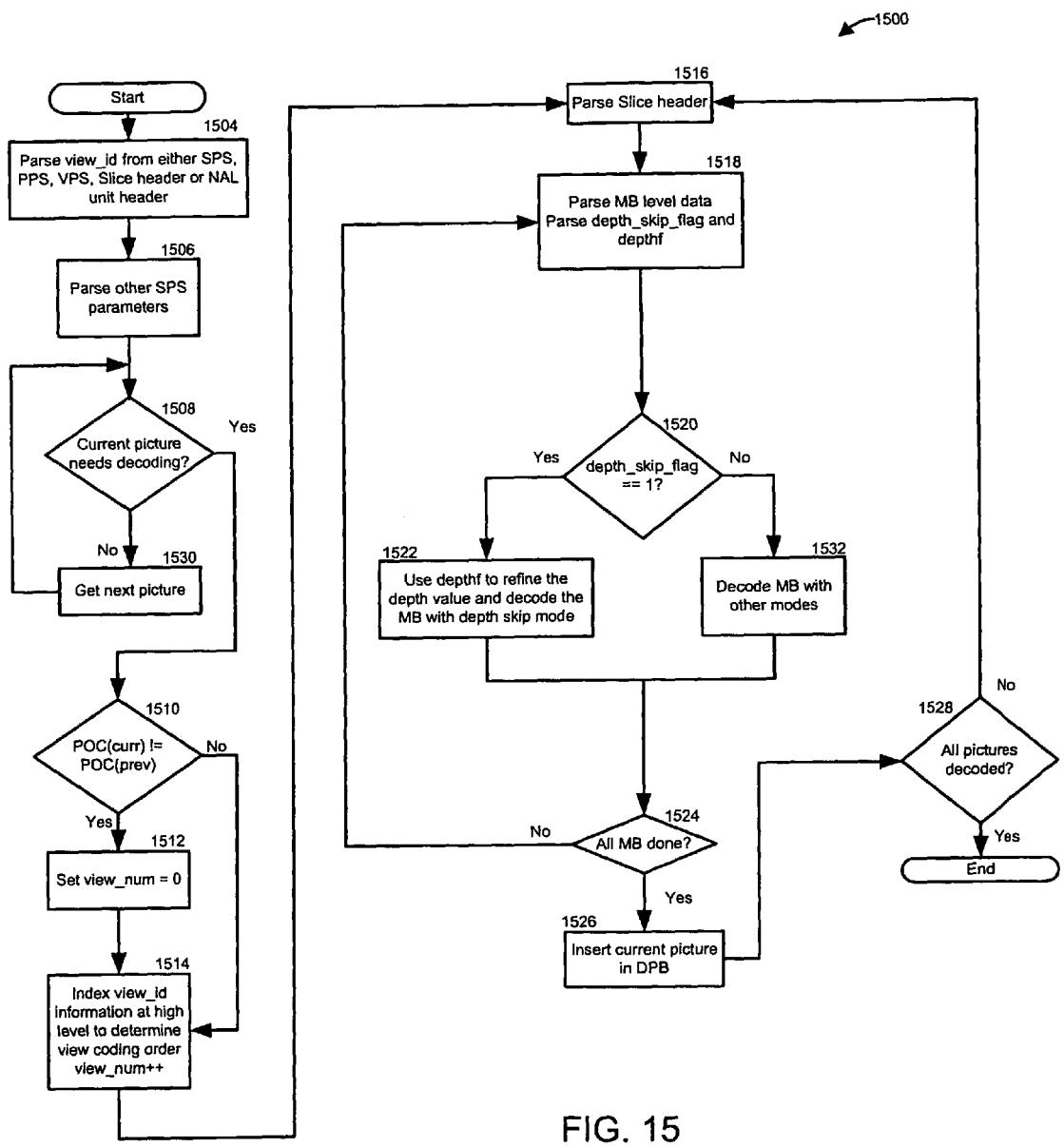
FIG. 15 is a diagram of an implementation of a decoding process.

FIG. 15 shows an exemplary method 1500 for decoding a slice using a refined depth of a current view, in accordance with an embodiment of the present principles. At step 1504, the view_id is parsed from the SPS, PPS, VPS, slice header, or network abstraction layer (NAL) unit header. At step 1506, other SPS parameters are parsed. At step 1508, it is determined whether or not the current picture needs decoding. If so, then control is passed to a step 1510. Otherwise, control is passed to a step 1530.

At step 1510, it is determined whether or not POC(curr) is equal to POC (prey). If so, then control is passed to a step 1512. Otherwise, control is passed to a step 1514.

At step 1512, view_num is set equal to zero.

At step 1514, view_id information is indexed at a high level to determine the view coding order, and view_num is incremented.

At step 1516, the slice header is parsed. At step 1518, macroblock level data, depth_skip_flag, and depthf are parsed. At step 1520, it is determined whether or not depth_skip_flag is equal to one. If so, then control is passed to a step 1522. Otherwise, control is passed to a step 1532.

At step 1522, depthf is used to refine the depth value and decode the macroblock with depth skip mode.

At step 1524, it is determined whether or not all macroblocks are done (being decoded). If so, then control is passed to a step 1526. Otherwise, control is returned to the step 1518.

At step 1526, the current picture is inserted into the decoded picture buffer. At step 1528, it is determined whether or not all pictures have been decoded. If so, then the method is terminated. Otherwise, control is returned to the step 1516.

At step 1530, the next picture is obtained.

At step 1532, the current macroblock is decoded using other modes (than depth skip mode per step 1522).

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Implementations may signal information using a variety of techniques including, but not limited to, in-band information, out-of-band information, datastream data, implicit signaling, and explicit signaling. In-band information and explicit signaling may include, for various implementations and/or standards, slice headers, SEI messages, other high level syntax, and non-high-level syntax. Accordingly, although implementations described herein may be described in a particular context, such descriptions should in no way be taken as limiting the features and concepts to such implementations or contexts.

The implementations and features described herein may be used in the context of the MPEG-4 AVC Standard, or the MPEG-4 AVC Standard with the MVC extension, or the MPEG-4 AVC Standard with the SVC extension. However, these implementations and features may be used in the context of another standard and/or recommendation (existing or future), or in a context that does not involve a standard and/or recommendation.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptpp, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method comprising:
accessing depth information for a picture in a set of pictures, the set of pictures including the reference picture and a target picture, the reference picture being from a reference view at a reference location, and the target picture being from a target view at a target location different from the reference location;
accessing modified depth information for the reference picture, wherein the modified depth information reduces, as compared to the depth information, a cost function for encoding the target picture;
determining a refinement that characterizes a difference between the depth information and the modified depth information;
warping the reference picture, based on the modified depth information, from the reference location to the target location;
encoding the target picture based on the warped reference picture; and
providing the encoded target picture along with the refinement and the depth information.

2. The method of claim 1 wherein warping the reference picture comprises:
warping the modified depth information from the reference location to the target location;
determining, based on the warped modified depth information, a correspondence between pixels in the reference picture and locations in the warped reference picture; and
determining the warped reference picture based on the correspondence.

3. The method of claim 1 wherein warping the reference picture comprises:
forward warping the reference picture, based on the modified depth information, from the reference location to the target location.

4. The method of claim 1 further comprising:
modifying the depth information for the reference picture to produce the modified depth information, the modifying being done so as to reduce a cost function for encoding the target picture, the cost function combining rate and distortion.

5. The method of claim 4 wherein the cost function accounts for one or more of:

rate due to encoding the refinement,
rate due to encoding the target picture based on a warping of the reference picture that is derived using the modified depth information rather than the depth information, or
distortion due to encoding the target picture based on a warping of the reference picture that is derived using the modified depth information rather than the depth information.

6. The method of claim 4 wherein modifying the depth information comprises iteratively modifying the depth information as long as the cost function at each iteration satisfies one or more criteria.

7. The method of claim 6, wherein the one or more criteria comprise one or more of the following:
the cost function is not more than a threshold amount lower than a last cost function;
the cost function is not below a threshold; and
the cost function has not gone up, or has not gone up more than a threshold number of times, or has not gone up more than a threshold amount or percentage.

8. The method of claim 1 further comprising modifying the depth information for the picture to produce the modified depth information.

9. The method of claim 1 wherein providing the refinement comprises encoding the refinement and providing the encoded refinement.

10. The method of claim 9 wherein encoding the refinement comprises predictively encoding the refinement using a previous refinement as a reference.

11. The method of claim 1 wherein determining the refinement comprises setting the refinement equal to the difference between the depth information and the modified depth information.

12. The method of claim 1 wherein the depth information comprises a depth map that includes the depth information.

13. The method of claim 1 wherein the set of pictures includes a further target picture that is from a third view, the reference picture also for use as a reference in encoding the further target picture, the third view being at a third location that is different from the reference location and the second location, and the method further comprises:
accessing a third-view modified depth information for the picture;
determining a third-view refinement that characterizes a difference between the depth information and the third-view modified depth information; and
providing the third-view refinement, and the depth information, for use in processing one or more pictures in the set of pictures.

14. The method of claim 13 further comprising:
encoding the further target picture based on the third-view modified depth information; and
providing the encoded further target picture along with the third-view refinement and the depth information.

15. The method of claim 14 wherein encoding the further target picture based on the third-view modified depth information comprises:
warping the reference picture, based on the third-view modified depth information, from the reference location to the third location; and
encoding the further target picture based on the third-view warped reference picture.

16. The method of claim 1 wherein:
the refinement include separate information at one of more levels of a hierarchy for the picture, the hierarchy including a pixel level, a partition level, a macroblock level, a slice level, and a picture level.

17. The method of claim 16 wherein the refinement includes a separate value for each pixel represented by the refinement.

18. The method of claim 16 wherein the refinement includes a separate value for each macroblock represented by the refinement, and the separate value for a given macroblock applies to each pixel within the given macro block.

19. The method of claim 1 wherein the depth information for the picture, the modified depth information for the picture, and the refinement apply only to a portion of the picture.

20. An apparatus comprising:
   means for accessing depth information for a reference picture in a set of pictures, the set of pictures including the reference picture and a target picture, the reference picture being from a reference view at a reference location, and the target picture being from a target view at a target location different from the reference location;
   means for accessing modified depth information for the picture, wherein the modified depth information reduces, as compared to the depth information, a cost function for encoding the target picture;
   means for determining a refinement that characterizes a difference between the depth information and the modified depth information;
   means for warping the reference picture, based on the modified depth information, from the reference location to the target location;
   means for encoding the target picture based on the warped reference picture; and
   means for providing the encoded target picture along with the refinement and the depth information.

21. A non-transitory processor readable medium having stored thereon instructions for causing a processor to perform at least the following:
   accessing depth information for a reference picture in a set of pictures the set of pictures including the reference picture and a target picture, the reference picture being from a reference view at a reference location, and the target picture being from a target view at a target location different from the reference location;
   accessing modified depth information for the reference picture, wherein the modified depth information reduces, as compared to the depth information, a cost function for encoding the target picture;
   determining a refinement that characterizes a difference between the depth information and the modified depth information;
   warping the reference picture, based on the modified depth information, from the reference location to the target location:
   encoding the target picture based on the warped reference picture; and
   providing the encoded target picture along with the refinement and the depth information.

22. An apparatus, comprising a processor configured to perform at least the following:
   accessing depth information for a picture in a set of pictures, the set of pictures including the reference picture and a target picture, the reference picture being from a reference view at a reference location, and the target picture being from a target view at a target location different from the reference location;
   accessing modified depth information for the picture, wherein the modified depth information reduces, as compared to the depth information, a cost function for encoding the target picture;
   determining a refinement that characterizes a difference between the depth information and the modified depth information;
   warping the reference picture, based on the modified depth information, from the reference location to the target location;
   encoding the target picture based on the warped reference picture; and
   providing the encoded target picture along with the refinement and the depth information.

23. An apparatus comprising:
   an accessing unit for accessing depth information for a reference picture in a set of pictures, the set of pictures including the reference picture and a target picture, the reference picture being from a reference view at a reference location, and the target picture being from a target view at a target location different from the reference location, and for accessing modified depth information for the reference picture, wherein the modified depth information reduces, as compared to the depth information, a cost function for encoding the target picture; and
   a depth refiner for
      (i) determining a refinement that characterizes a difference between the depth information and the modified depth information,
      (ii) warping the reference picture, based on the modified depth information, from the reference location to the target location,
      (iii) encoding the target picture based on the warped reference picture, and
      (iv) providing the encoded target picture along with the refinement and the depth information.

24. The apparatus of claim 23 wherein the apparatus is implemented in a video encoder.

25. An apparatus comprising:
   an accessing unit for accessing depth information for a reference picture in a set of pictures, the set of pictures including the reference picture and a target picture, the reference picture being from a reference view at a reference location, and the target picture being from a target view at a target location different from the reference location, and for accessing modified depth information for the reference picture, wherein the modified depth information reduces, as compared to the depth information, a cost function for encoding the target picture;
   a depth refiner for
   (i) determining a refinement that characterizes a difference between the depth information and the modified depth information,
   (ii) warping the reference picture, based on the modified depth information, from the reference location to the target location,
   (iii) encoding the target picture based on the warped reference picture, and
   (iv) providing the encoded target picture along with the refinement and the depth information; and
   a modulator (320) for modulating a signal, the signal including the refinement and the depth information.

26. A method comprising:
   accessing an encoding of a target picture;
   accessing a decoded reference picture, the reference picture being from a reference view at a reference location, and the target picture being from a target view at a target location different from the reference location;
   accessing depth information for the reference picture;
   accessing a refinement that characterizes a difference between the depth information for the reference picture, wherein the modified depth information reduces, as compared to the depth information, from the reference location to the target location; and determining the modified depth information for the reference picture; and warping the decoded reference picture, based on the modified depth information, from the reference location to the target location; and decoding the target picture based on the warped decoded reference picture to produce a decoded target picture.

27. The method of claim 26 wherein warping the decoded reference picture comprises:

warping the modified depth information from the reference location to the second location;

determining, based on the warped modified depth information, a correspondence between pixels in the decoded reference picture and locations in the warped decoded reference picture; and determining the warped decoded reference picture based on the correspondence.

28. The method of claim 26 wherein warping the decoded reference picture comprises:

forward warping the decoded reference picture, based on the modified depth information, from the reference location to the target location.

29. The method of claim 28 wherein the cost function combines rate and distortion.

30. The method of claim 29 wherein the cost function accounts for one or more of:

rate due to encoding the refinement, rate due to encoding the target picture based on a warping of the reference picture that is derived using the modified depth information rather than the depth information, and distortion due to encoding the target picture based on a warping of the reference picture that is derived using the modified depth information rather than the depth information.

31. The method of claim 26 wherein the accessed refinement comprises an encoded refinement.

32. The method of claim 31 wherein the encoded refinement has been predictively encoded using a previous refinement as a reference.

33. The method of claim 26 wherein the accessed refinement is equal to the difference between the depth information and the modified depth information.

34. The method of claim 26 wherein the depth information comprises a depth map that includes the depth information.

35. The method of claim 26 wherein a further target picture is from a third view, the reference picture also has been used as a reference in encoding the further target picture, the third view being at a third location that is different from the reference location and the target location, and the method further comprises:

accessing a third-view refinement that characterizes a difference between the depth information and a third-view modified depth information;

determining the third-view modified depth information for the reference picture; and processing the further target picture using the third-view modified depth information.

36. The method of claim 35 further comprising:

decoding the further target picture based on the third-view modified depth information; and providing the decoded further target picture for processing or display.

37. The method of claim 36 wherein decoding the further target picture based on the third-view modified depth information comprises:

warping the reference picture, based on the third-view modified depth information, from the reference location to the third location; and decoding the further target picture based on the third-view warped reference picture.

38. The method of claim 26 wherein:

the refinement includes separate information at one of more levels of a hierarchy for the picture, the hierarchy including a pixel level, a partition level, a macroblock level, a slice level, and a picture level.

39. The method of claim 38 wherein the refinement includes a separate value for each pixel represented by the refinement.

40. The method of claim 38 wherein the refinement includes a separate value for each macroblock represented by the refinement, and the separate value for a given macroblock applies to each pixel within the given macroblock.

41. The method of claim 26 wherein the depth information for the reference picture, the modified depth information for the reference picture, and the refinement apply only to a portion of the reference picture.

42. The method of claim 26 further comprising:

rendering a picture from a virtual view using the reference picture and the depth information.

43. An apparatus comprising:

means for accessing an encoding of a target picture;

means for accessing a decoded reference picture, the reference picture being from a reference view at a reference location, and the target picture being from a target view at a target location different from the reference location;

means for accessing depth information for the reference picture;

means for accessing a refinement that characterizes a difference between the depth information for the reference picture and modified depth information for the reference picture, wherein the modified depth information reduces, as compared to the depth information, a cost function for encoding the target picture;

means for determining the modified depth information for the reference picture; and means for warping the decoded reference picture, based on the modified depth information, from the reference location to the target location; and means for decoding the target picture based on the warped decoded reference picture to produce a decoded target picture.

44. A non-transitory processor readable medium having stored thereon instructions for causing a processor to perform at least the following:

accessing an encoding of a target picture;

accessing a decoded reference picture, the reference picture being from a reference view at a reference location, and the target picture being from a target view at a target location different from the reference location;

accessing depth information for the reference picture;

accessing a refinement that characterizes a difference between the depth information for the reference picture and modified depth information for the reference picture, wherein the modified depth information reduces, as compared to the depth information, a cost function for encoding the target picture;

determining the modified depth information for the reference picture;

warping the decoded reference picture, based on the modified depth information, from the reference location to the target location; and decoding the target picture based on the warped decoded reference picture to produce a decoded target picture.

45. An apparatus, comprising a processor configured to perform at least the following:

accessing an encoding of a target picture;

accessing a decoded reference picture, the reference picture being from a reference view at a reference location, and the target picture being from a target view at a target location different from the reference location;

accessing depth information for the reference picture;

accessing a refinement that characterizes a difference between the depth information for the reference picture and modified depth information for the reference picture, wherein the modified depth information reduces, as compared to the depth information, a cost function for encoding the target picture;

determining the modified depth information for the reference picture;

warping the decoded reference picture, based on the modified depth information, from the reference location to the target location; and decoding the target picture based on the warped decoded reference picture to produce a decoded target picture.

46. An apparatus comprising:

an accessing unit for
  (i) accessing an encoding of a target picture,
  (ii) accessing a decoded reference picture, the reference picture being from a reference view at a reference location, and the target picture being from a target view at a target location different from the reference location,
  (iii) accessing depth information for the reference picture, and
  (iv) accessing a refinement that characterizes a difference between the depth information for the reference picture and modified depth information for the reference picture, wherein the modified depth information reduces, as compared to the depth information, a cost function for encoding the target picture; and a depth refiner for
  (i) determining the modified depth information for the reference picture,
  (ii) warping the decoded reference picture, based on the modified depth information, from the reference location to the target location, and
  (iii) decoding the target picture based on the warped decoded reference picture to produce a decoded target picture.

47. The apparatus of claim 46 wherein the apparatus is implemented in at least one of a video encoder and a video decoder.

48. An apparatus comprising:

a demodulator for receiving and demodulating a signal, the signal including coded video information for a set of pictures, depth information for a picture in the set of pictures, and a refinement that characterizes a difference between the depth information for the picture and modified depth information for the picture;

an accessing unit for
  (i) accessing an encoding of a target picture,
  (ii) accessing a decoded reference picture, the reference picture being from a reference view at a reference location, and the target picture being from a target view at a target location different from the reference location,
  (iii) accessing depth information for the reference picture, and
  (iv) accessing a refinement that characterizes a difference between the depth information for the reference picture and modified depth information for the reference picture, wherein the modified depth information reduces, as compared to the depth information, a cost function for encoding the target picture; and a depth refiner for
  (i) determining the modified depth information for the reference picture,
  (ii) warping the decoded reference picture, based on the modified depth information, from the reference location to the target location, and
  (iii) decoding the target picture based on the warped decoded reference picture to produce a decoded target picture.

49. The method of claim 1 wherein encoding the target picture comprises predictive encoding the target picture using the warped reference picture as a reference.

50. The method of claim 1 wherein the depth information is provided for rendering a new picture, based on the reference picture, for display.

* * * * *